US008269838B2

(12) United States Patent
Sugawa et al.

(10) Patent No.: US 8,269,838 B2
(45) Date of Patent: Sep. 18, 2012

(54) SOLID-STATE IMAGE SENSOR AND IMAGING DEVICE

(75) Inventors: Shigetoshi Sugawa, Sendai (JP); Yasushi Kondo, Kyoto (JP); Hideki Tominaga, Uji (JP)

(73) Assignees: Tohoku University, Sendai-shi (JP); Shimadzu Corporation, Kyoto (JP)

( * ) Notice: Subject to any disclaimer, the term of this patent is extended or adjusted under 35 U.S.C. 154(b) by 436 days.

(21) Appl. No.: 12/676,532

(22) PCT Filed: Sep. 4, 2008

(86) PCT No.: PCT/JP2008/002427
§ 371 (c)(1),
(2), (4) Date: Mar. 4, 2010

(87) PCT Pub. No.: WO2009/031303
PCT Pub. Date: Mar. 12, 2009

(65) Prior Publication Data
US 2010/0182470 A1   Jul. 22, 2010

(30) Foreign Application Priority Data

Sep. 5, 2007  (JP) ................................. 2007-230180

(51) Int. Cl.
H04N 5/228 (2006.01)
H04N 5/335 (2011.01)
(52) U.S. Cl. .................................... 348/208.1; 348/294
(58) Field of Classification Search ............... 348/208.1, 348/208.4, 294, 169
See application file for complete search history.

(56) References Cited

U.S. PATENT DOCUMENTS 5,313,296 A * 5/1994 Ohki ........................ 348/208.1
6,674,889 B1 * 1/2004 Takayama ................. 382/149
6,753,904 B1 * 6/2004 Nomura .................... 348/208.1
6,972,795 B1 * 12/2005 Etoh et al. ................ 348/311
7,808,536 B2 * 10/2010 Yamada et al. ........... 348/297

(Continued)

FOREIGN PATENT DOCUMENTS

EP  1 041 637 A1  10/2000

(Continued)

OTHER PUBLICATIONS

Sushi Kondo et al., "Development of "Hypervision HPV-1" High-speed Video Camera", Shimadzu Review, Sep. 30, 2005, pp. 79-86, vol. 62, Nos. 1-2.

Primary Examiner — Lin Ye
Assistant Examiner — Amy Hsu
(74) Attorney, Agent, or Firm — Sughrue Mion, PLLC

(57) ABSTRACT

A pixel output line (14) is independently provided for each of the pixels arranged in a two-dimensionally array within a pixel area so that pixel signals can be sequentially written in a plurality of memory sections (22) through the pixel output lines (14). When a plurality of frames of pixel signals are held in the memory sections (22), the pixel signals corresponding to two arbitrarily selected frames are read and respectively stored in sample-and-hold circuits (61 and 62), and their difference is obtained. Then, the difference signals corresponding to a predetermined range of the image are integrated, and the integrated value is compared with a threshold. If the integrated value exceeds the threshold, it is presumed that a change in an imaging object has occurred, and a pulse generation circuit (66) generates a trigger signal. By controlling the discontinuation and other imaging actions according to this trigger signal, it is possible to correctly take high-speed images of the situation before or after the occurrence of an objective phenomenon.

16 Claims, 17 Drawing Sheets

U.S. PATENT DOCUMENTS

| | | | |
|---|---|---|---|
| 2003/0052983 A1* | 3/2003 | Altree | 348/308 |
| 2004/0012684 A1* | 1/2004 | Tinnerino | 348/208.1 |
| 2007/0109433 A1* | 5/2007 | Yamada et al. | 348/294 |

FOREIGN PATENT DOCUMENTS

| | | |
|---|---|---|
| JP | 62-190753 A | 8/1987 |
| JP | 63-174356 A | 7/1988 |
| JP | 05-336420 A | 12/1993 |
| JP | 2000-165750 A | 6/2000 |
| JP | 2001-345441 A | 12/2001 |
| JP | 2003-116056 A | 4/2003 |
| JP | 2006-245522 A | 9/2006 |
| JP | 2007-166581 A | 6/2007 |
| WO | 00/17930 A1 | 3/2000 |

* cited by examiner

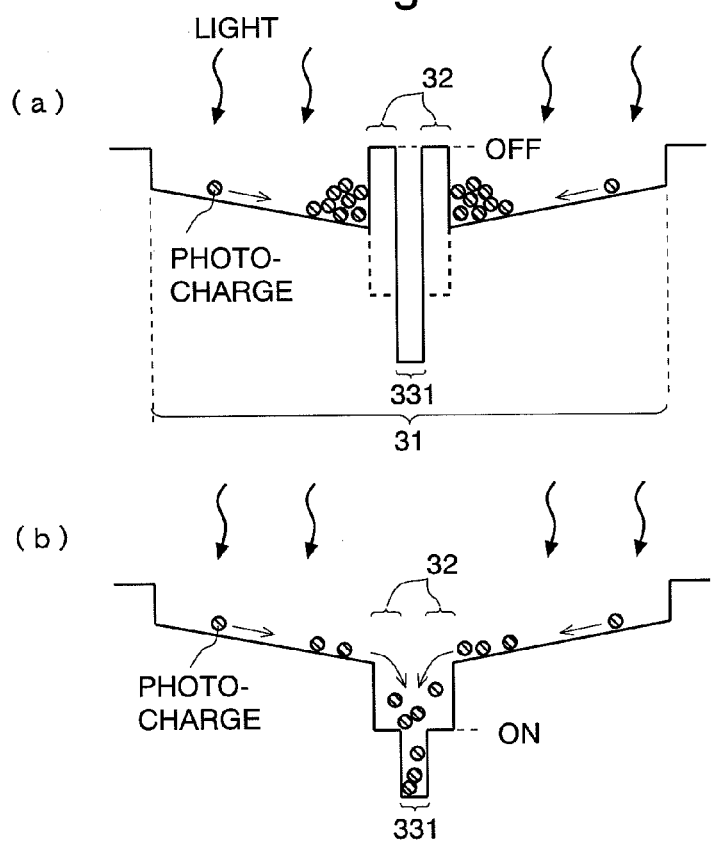
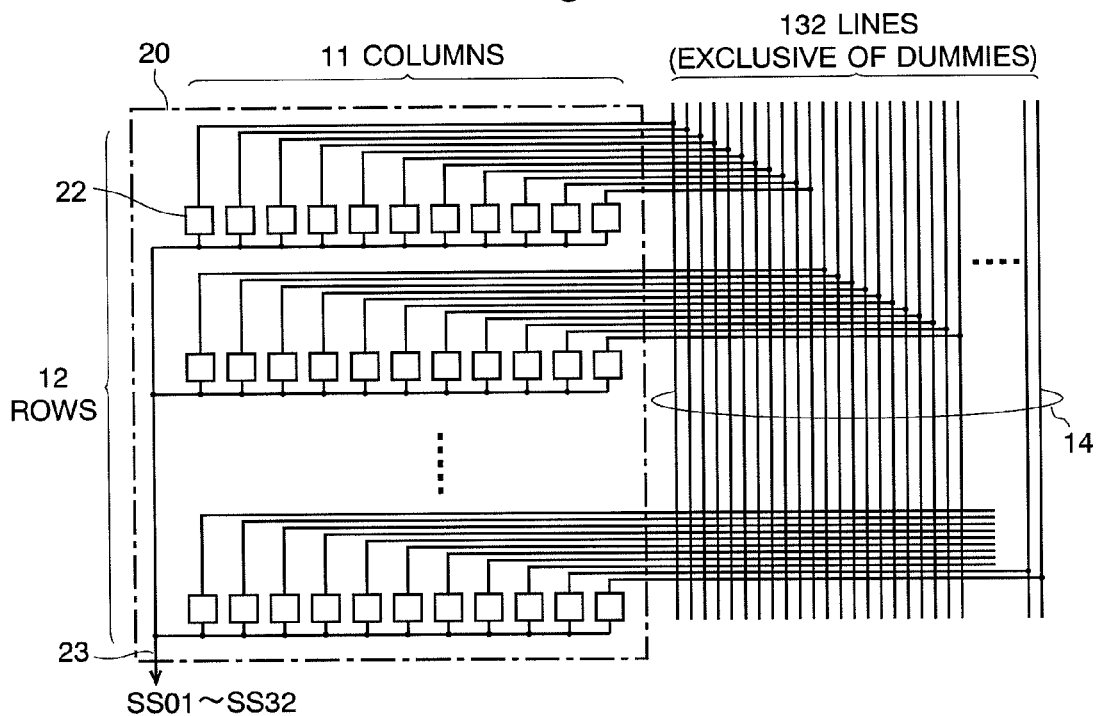

Fig. 11
(a) CONTINUOUS READING MODE (ONE FRAME ONLY)
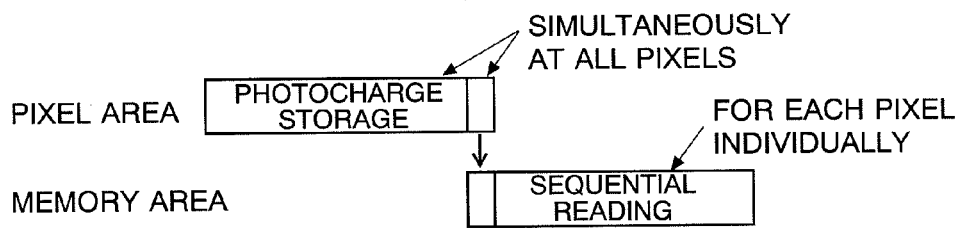
(b) CONTINUOUS READING MODE (REPEATED)
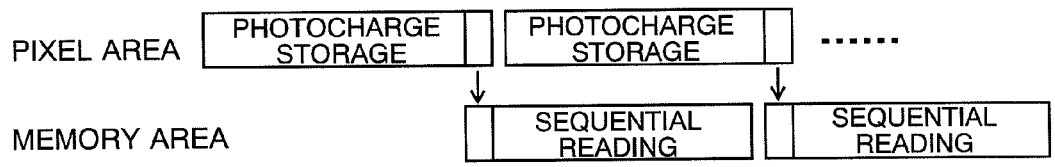
(c) BURST READING MODE
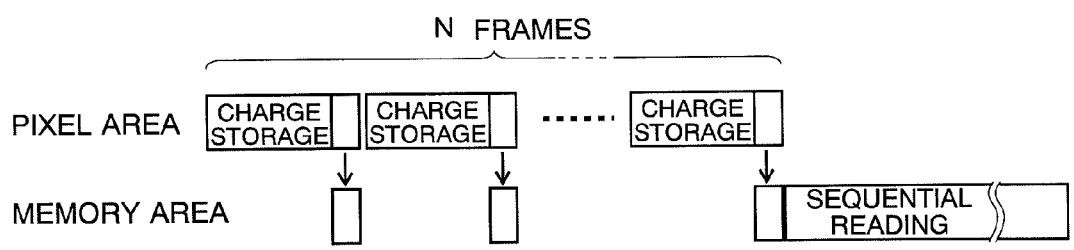

SOLID-STATE IMAGE SENSOR AND IMAGING DEVICE

CROSS REFERENCE TO RELATED APPLICATIONS

This application is a National Stage of International Application No. PCT/JP2008/002427 filed Sep. 4, 2008, claiming priority based on Japanese Patent Application No. 2007-230180, filed Sep. 5, 2007, the contents of all of which are incorporated herein by reference in their entirety.

TECHNICAL FIELD

The present invention relates to a solid-state image sensor and an imaging device using the solid-state image sensor. More specifically, it relates to a solid-state image sensor and imaging device capable of high-speed operations suitable for taking images of high-speed phenomena, such as destructions, explosions and combustions, and a drive method for such a sensor.

BACKGROUND ART

High-speed imaging devices (high-speed video cameras) for taking consecutive images of high-speed phenomena such as explosions, destructions, combustions, collisions and discharges for only a short period of time have been conventionally developed (for example, refer to Non-Patent Document 1 and other documents). Such high-speed imaging devices need to perform an ultrahigh-speed imaging operation that exceeds a level of approximately one million frames per second. Accordingly, they use solid-state image sensors capable of high-speed operations, which have special structures different from those of the imaging devices used in normal video cameras, digital cameras and similar devices.

As an example of this type of solid-state image sensor, a device called an in-situ storage image sensor (IS-CCD), which is disclosed in Patent Document 1 and other documents, has been generally known. An outline of this image sensor is as follows: A storage CCD, which also serves for the transfer of a specified number of recorded images (frames), is provided for each photodiode as a photo-receiver. During an imaging operation, pixel signals resulting from photoelectric conversion by the photodiode are sequentially transferred to the storage CCD. After the imaging operation is completed, the pixel signals corresponding to the specified number of record frames stored in the storage CCD are collectively read, and the images corresponding to the specified number of record frames are reproduced outside the image sensor. During the imaging operation, pixel signals exceeding the specified number of image frames are discarded beginning from the oldest ones. Thus, the latest set of pixel signals corresponding to the specified number of frames are held in the storage CCD. This means that, when the transfer of pixel signals to the storage CCD is suspended at the completion of the imaging operation, one can obtain the latest series of images spanning from the completion of the imaging operation back through a period of time corresponding to the specified number of record frames.

In the aforementioned high-speed imaging, it is important to perform the imaging in synchronization with the timing of the occurrence of a phenomenon under observation. This is achieved by a control process in which the imaging action is discontinued or initiated in response to an externally given trigger signal. To generate this trigger signal, the system normally includes another sensor, such as a contact sensor, position sensor, vibration sensor or pressure sensor, in addition to the imaging device. However, in some situations, it is often difficult to obtain appropriate trigger signals by this method, as in the case where the sensor cannot be easily placed close to the object, where the imaging action must capture a spontaneous change in the object under observation, or where the imaging object is a micro-sized object under a microscope.

When, as in the aforementioned cases, it is difficult to obtain an appropriate trigger signal from another sensor, it is desirable to generate a trigger signal by detecting a movement of or change in an object from images of that object. For a relatively low-speed imaging operation, a device for detecting a movement of or change in an object by real-time image processing of acquired images and for generating a trigger signal has been already developed. In this type of device, the reference clock for driving the solid-state image sensor is raised to a level several times to several tens of times the imaging rate required for the actual imaging (i.e. it is operated in an over-sampling mode), and a real-time motion detection of an object is performed on the images reproduced from the image signals read from the solid-state image sensor. When, a movement of or change in the object is detected, a trigger signal is generated, whereupon the true imaging action is initiated or discontinued and the control of some devices other than the imaging device is performed (e.g. an illuminating device for imaging is turned on or off).

However, in the case of detecting a movement of or change in an object in real-time by image processing of the signals read from the image sensor, it is normally necessary to preserve the images in an external frame memory and perform a large amount of computation, which tends to increase the delay time from an occurrence of an objective phenomenon to the generation of a trigger signal. Particularly, in the case of high-speed imaging, this delay time may prevent the objective phenomenon from being captured in the resultant images.

To address these problems, an imaging system disclosed in Patent Document 2 uses a light-splitting means, such as a beam splitter or half mirror, provided behind the imaging lens. The light-splitting means separates incident light into plural beams, which are respectively introduced into two imaging devices, i.e. the first and second imaging devices. The first imaging device is dedicated to the monitoring to detect a sudden change in the image. According to a trigger signal generated by this imaging device, the acquisition of image signals in the second imaging device is controlled. This type of conventional imaging system requires optical parts to split incident light coming from the imaging object into plural beams, and additionally needs more than one imaging device (image sensor). Thus, the system will be large and complex, making it difficult to reduce the production cost and decrease the size and weight of the system.

Patent Document 3 discloses a system in which a change detection element dedicated for detecting a change in the amount of incident light is provided within and/or around the pixel area of a solid-state image sensor, and the initiation and discontinuation of imaging is controlled on the basis of a detection signal of the change detection element. However, providing the change detection element within the image sensor area inevitably lowers the quality of the resultant images since the pixel signals required for the imaging cannot be obtained at the portion where the change detection element is present. In one configuration that has been proposed to avoid this problem, the change detection element is located apart from the image sensor area, and a prism, half mirror or similar device is provided to split incident light into separate beams, which are respectively cast onto the change detection element and image sensor area. However, as in the conventional technique described in Patent Document 2, using an optical system for light-splitting purposes significantly increases the production cost. Furthermore, detecting a change that occurs within a portion of the imaging range requires a considerable number of change detection elements, which increases the chip area of the solid-state image sensor and accordingly increases the production cost.

Patent Document 1: Japanese Unexamined Patent Application Publication No. 2001-345441

Patent Document 2: Japanese Unexamined Patent Application Publication No. H05-336420

Patent Document 3: Japanese Unexamined Patent Application Publication No. 2007-166581

Non-Patent Document 1: Kondo et al., "Kousokudo Bideo Kamera HyperVision HPV-1 no Kaihatsu (Development of "HyperVision HPV-1" High-Speed Video Camera))", *Shimadzu Hyouron (Shimadzu Review)*, Shimadzu Hyouron Henshuu-bu, Sep. 30, 2005, Vol. 62, No. 1/2, pp. 79-86

DISCLOSURE OF THE INVENTION

Problem to be Solved by the Invention

The present invention has been developed in view of the previously described problems. Its main objective is to provide a solid-state image sensor that uses no special optical system yet is capable of assuredly detecting a movement of or change in an object or an occurrence of a specific phenomena under observation in a series of consecutively taken images and generating a trigger signal for controlling the initiation and discontinuation of high-speed imaging and/or for controlling external apparatuses.

Another objective of the present invention is to provide a low-cost imaging device capable of assuredly detecting and recording a high-speed objective phenomenon by using the aforementioned solid-state imaging sensor.

Means for Solving the Problems

The present invention aimed at solving the aforementioned problems provides a solid-state image sensor, which is characterized by including:

a) a plurality of pixels arranged in a two-dimensional array, each pixel including a photoelectric conversion element for receiving light and producing photocharges, a transfer element for transferring the photocharges produced by the photoelectric conversion element to a detection node, and a buffer element for sending an output signal corresponding to a charge from the detection node to a pixel output line to be mentioned later;

b) a pixel output line independently provided for each pixel;

c) a plurality of memory sections provided for each pixel in order to hold a signal extracted from the pixel through the pixel output line;

d) a drive control means for operating the pixels and the memory sections so that the signals corresponding to a portion or all of the pixels belonging to two frames obtained at different points in time are sequentially read from the memory sections concerned, in the middle of the process where an operation of storing photocharges corresponding to an imaging action at each pixel and an operation of transferring signals from each pixel through the pixel output line to one of the memory sections are repeatedly performed simultaneously at all the pixels while the memory section to hold the signal is sequentially selected for each imaging action; and e) a trigger signal generating means for detecting a change in or movement of an imaging object on the basis of the signals corresponding to a portion or all of the pixels belonging to the two frames sequentially read under the control of the drive control means, and for generating a trigger signal.

In a possible variation of the solid-state image sensor according to the present invention, the photoelectric conversion element in each pixel may be a photodiode; the detection node, which converts charge signals to voltage signals, may be a floating diffusion (floating region); the transfer element may be a transistor (MOS transistor); the buffer element may be a source follower amplifier composed of a plurality of transistors; and the memory section may be a combination of a capacitor and a switch such as a transistor.

In the solid-state image sensor according to the present invention, a continuous imaging operation can be performed at extremely high speeds by performing, in a specified order of the memory sections, the operation of storing signals (pixel signals) obtained by the imaging operation through the pixel output line into one of the memory sections without extracting them to the outside of the sensor every time the imaging action, i.e. the photocharge storage for one frame, is performed. After the memory sections provided for each pixel have all been occupied by the signals as a result of the repetition of imaging, the oldest signals can be discarded (which practically means resetting the contents of the memory sections concerned) to hold new signals. The transfer of the signals from each pixel through the pixel output line to the memory section can be completed within an extremely short period of time. Therefore, the period of time required for taking one frame of image is mostly determined by the period of time required for receiving light by the photoelectric conversion element and storing the photocharges into the detection node or the like.

In the course of the high-speed imaging, the drive control means sequentially reads, from the memory sections concerned, the signals corresponding to a portion or all of the pixels belonging to two frames obtained at different points in time, e.g. the latest frame and second to latest frame or the latest frame and an earlier frame separated from the latest one by two or more frames. For the other memory sections that are not involved in this sequential reading, the signal transfer through the pixel output lines can be continued. Therefore, the imaging operation can be continued even during the sequential reading.

The trigger signal generating means detects a movement of or change in an imaging object by using the signals corresponding to the two sequentially read frames of images. For example, the detection process may include calculating a difference in the pixel signal at the same position, summing the difference values at each pixel, and determining that a movement of or change in an object has occurred when the sum exceeds a threshold.

The pixel-by-pixel comparison (difference calculation) of the pixel signals is liable to be influenced by image blurring due to external vibrations or other factors. Given this problem, it is preferable, for example, that, when the signals corresponding to a portion or all of the pixels corresponding to the two frames are sequentially read from the memory sections concerned, the signals corresponding to a plurality of pixels located next to or close to each other in the horizontal direction and/or vertical direction within the pixels arranged in the two-dimensional array are simultaneously read, and the difference between the frames is calculated in the previously described manner after the read signals are subjected to an adding or averaging operation.

By this configuration, the influence of image blurring or the like is reduced so that the detection accuracy of a movement of or change in an imaging object can be improved. Furthermore, the time required for sequentially reading signals from the memory sections to generate the trigger signal is reduced, so that the time delay from an occurrence of a movement of or change in an object to the obtainment of the trigger signal is shortened.

To obtain the latter effect, it is also possible to perform a skip reading at predetermined intervals in the horizontal direction and/or vertical direction within the pixels arranged in the two-dimensional array when the signals corresponding to a portion or all of the pixels corresponding to the two frames are sequentially read from the memory sections concerned.

In the solid-state image sensor according to the present invention, the drive control means may discontinue the imaging operation on the basis of the trigger signal generated by the trigger signal generating means, and sequentially read and output the signals corresponding to a plurality of frames held in the memory sections.

The discontinuation of the imaging operation on the basis of the trigger signal does not always mean that the imaging is discontinued immediately after the trigger signal is obtained; it is possible to insert an appropriate time delay or appropriate frame-number delay between the timing of generation of the trigger signal and the discontinuation of the imaging operation. In this case, it is preferable that the time delay or frame-number delay can be externally set, i.e. by users. By appropriately setting the delay, it is possible to initiate continuous imaging from a point in time that substantially coincides with the generation of the trigger signal, and obtain consecutive images whose number equals the number of frames predetermined by the number of memory sections. It is also possible to discontinue the imaging as soon as the trigger signal is generated, to obtain a predetermined number of frames of images ranging from the generation of the trigger signal in reverse chronological order.

In the solid-state image sensor according to the present invention, it is preferable that a specific range within the two frames for generating the trigger signal can be externally set.

As in the case of an explosion, when an imaging device using the present solid-state image sensor is used to capture a sign of a phenomenon whose image should be taken at high speeds, it is not always necessary to observe the entire image being taken; observing a small portion of the image is often sufficient. In such a case, the region where the inter-frame difference must be monitored to generate a trigger signal can be reduced to decrease the number of signals to be sequentially read and thereby achieve quick detection of a movement of or change in an object. This method shortens the time delay from an actual occurrence of a movement of or change in an object to the generation of a trigger signal.

In the solid-state image sensor according to the present invention, it is preferable that the frame interval or the time difference between the two frames for generating the trigger signal can be externally set. By this method, the trigger signal can be generated at an appropriate timing according to the type of the phenomenon of interest or the mode of the movement of or change in the imaging object.

The solid-state image sensor according to the present invention may preferably include an output terminal for sending to the outside the trigger signal generated by the trigger signal generating means. The trigger signal sent to the outside facilitates various control operations, such as energizing a lighting device or initiating an imaging operation in another imaging device. It also enables the imaging operation to be controlled in more sophisticated forms and with higher degrees of freedom; for example, it is possible to initiate or discontinue the imaging operation when a trigger signal is generated under another condition, rather than controlling the initiation or discontinuation of the imaging operation in response to the trigger signal inside the solid-state image sensor.

The imaging device according to the present invention is an imaging device using any of the previously described solid-state image sensors according to the present invention, and includes a control means for controlling the initiation or discontinuation of an imaging operation of the solid-state image sensor in response to the trigger signal generated by the trigger signal generating means.

The control means, which is provided outside the solid-state image sensor, may include a logic circuit for calculating the logical sum of the aforementioned trigger signal and another signal (e.g. a sensor trigger signal obtained with another sensor) and for calculating the logical product of the trigger signal and a signal indicating the presence of another condition, a delay circuit for delaying the trigger signal, and other components.

Effect of the Invention

By the solid-state image sensor and imaging device according to the present invention, it is possible to quickly, i.e. with no significant delay in time, generate a trigger signal that correctly captures an occurrence of an objective phenomenon or a movement of or change in an object, so that the images of the objective phenomenon can be assuredly taken. Generating the trigger signal requires neither the detection signal of another sensor (e.g. a vibration sensor) nor an image taken with another imaging device. The trigger signal can be generated by the solid-state image sensor itself without using complex optical systems. Thus, the present technique is advantageous to reducing the system cost.

BRIEF DESCRIPTION OF THE DRAWINGS

FIG. 7 is a schematic potential diagram at the vertical section indicated by the arrowed line A-A' in FIG. 6.

FIG. 8 is a schematic configuration diagram of one memory section unit corresponding to 132 pixels vertically arranged in the solid-state image sensor of the present embodiment.

FIG. 11 is a schematic time chart of a continuous reading mode and burst reading mode in the solid-state image sensor of the present embodiment.

EXPLANATION OF NUMERALS

| | |
|---|---|
| 1 | Semiconductor Substrate |
| 2, 2a, 2b | Pixel Area |
| 3a, 3b | Memory Area |
| 4a, 4b | Vertical Scan Circuit Area |
| 5a, 5b | Horizontal Scan Circuit Area |
| 6a, 6b | Current Source Area |
| 10 | Pixel |
| 11 | Photoelectric Conversion Area |
| 12 | Pixel Circuit Area |
| 13 | Wiring Area |
| 14, 141 | Pixel Output Line |
| 15 | Drive Line |
| 20 | Memory Section Unit |
| 21 | Row of Memory Section Unit |
| 22 | Memory Section |
| 23, 23a, 23b, 23c, 23d | Output Line |
| 24, 24a, 24b, 24c, 24d | Memory Element |
| 25, 25a, 25b, 25c, 25d | Capacitor |
| 26, 26a, 26b, 26c, 26d | Sampling Transistor |
| 27, 27a, 27b, 27c, 27d | Reading Transistor |
| 31 | Photodiode |
| 32 | Transfer Transistor |
| 33, 331, 332 | Floating Diffusion |
| 333 | Metallic Wiring |
| 34 | Storage Transistor |
| 35 | Reset Transistor |
| 36 | Storage Capacitor |
| 37, 40 | Transistor |
| 38, 41 | Selection Transistor |
| 39 | Current Source |
| 43 | Source Follower Amplifier |
| 50 | Memory Section Unit Block |
| 60 | Trigger Signal Generator |
| 61, 62 | Sample-and-Hold Circuit Section |
| 63 | Difference Circuit |
| 64 | Integration Circuit |
| 65 | Comparator |
| 66 | Pulse Generation Circuit |
| 70 | Solid-State Image Sensor |
| 71 | Trigger Signal Operation Circuit |
| 72 | Trigger Signal Input Terminal |
| 73 | Trigger Signal Output Terminal |
| 74 | Imaging Controller |
| 75 | Control Circuit |
| VSR1 | Vertical Shift Register |
| HSR1 | Horizontal Shift Register |

BEST MODE FOR CARRYING OUT THE INVENTION

A solid-state image sensor and an imaging device which is an embodiment of the present invention is hereinafter described with reference to the attached drawings.

Figure 1:
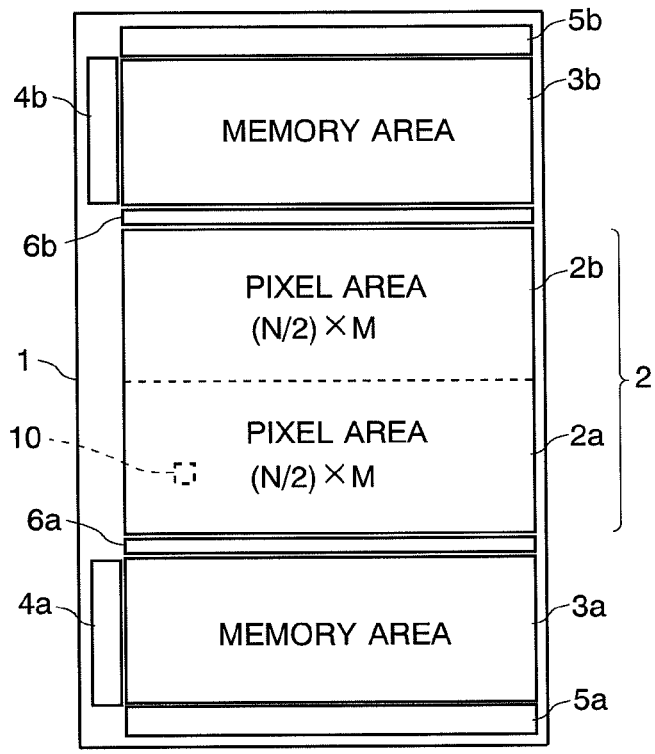
FIG. 1 is a schematic plan view showing the layout on a semiconductor chip of a solid-state image sensor which is an embodiment of the present invention.
Figure 3:
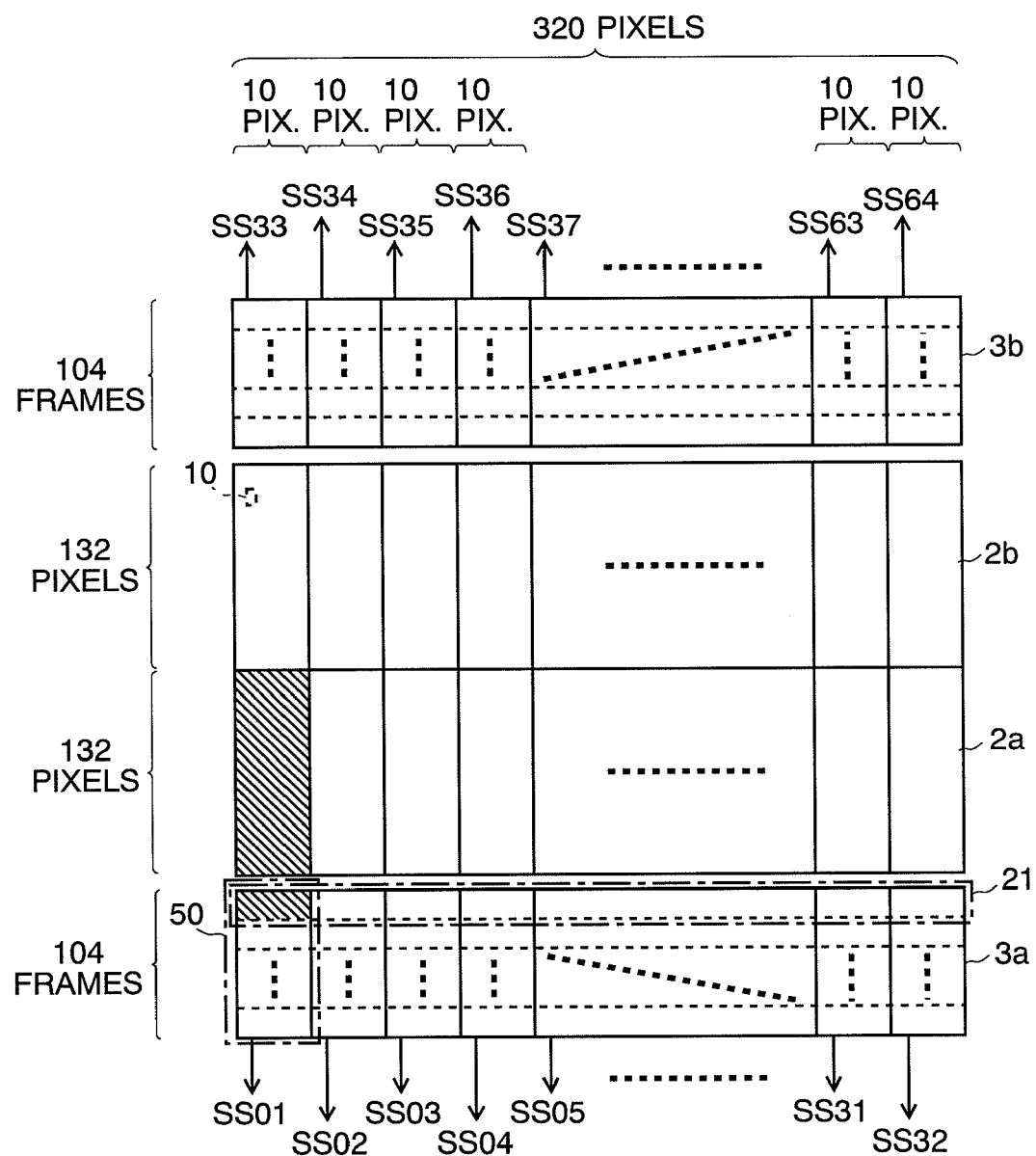
FIG. 3 is a plan view showing a schematic configuration of the pixel area and memory area in the solid-state image sensor of the present embodiment.
Figure 4:
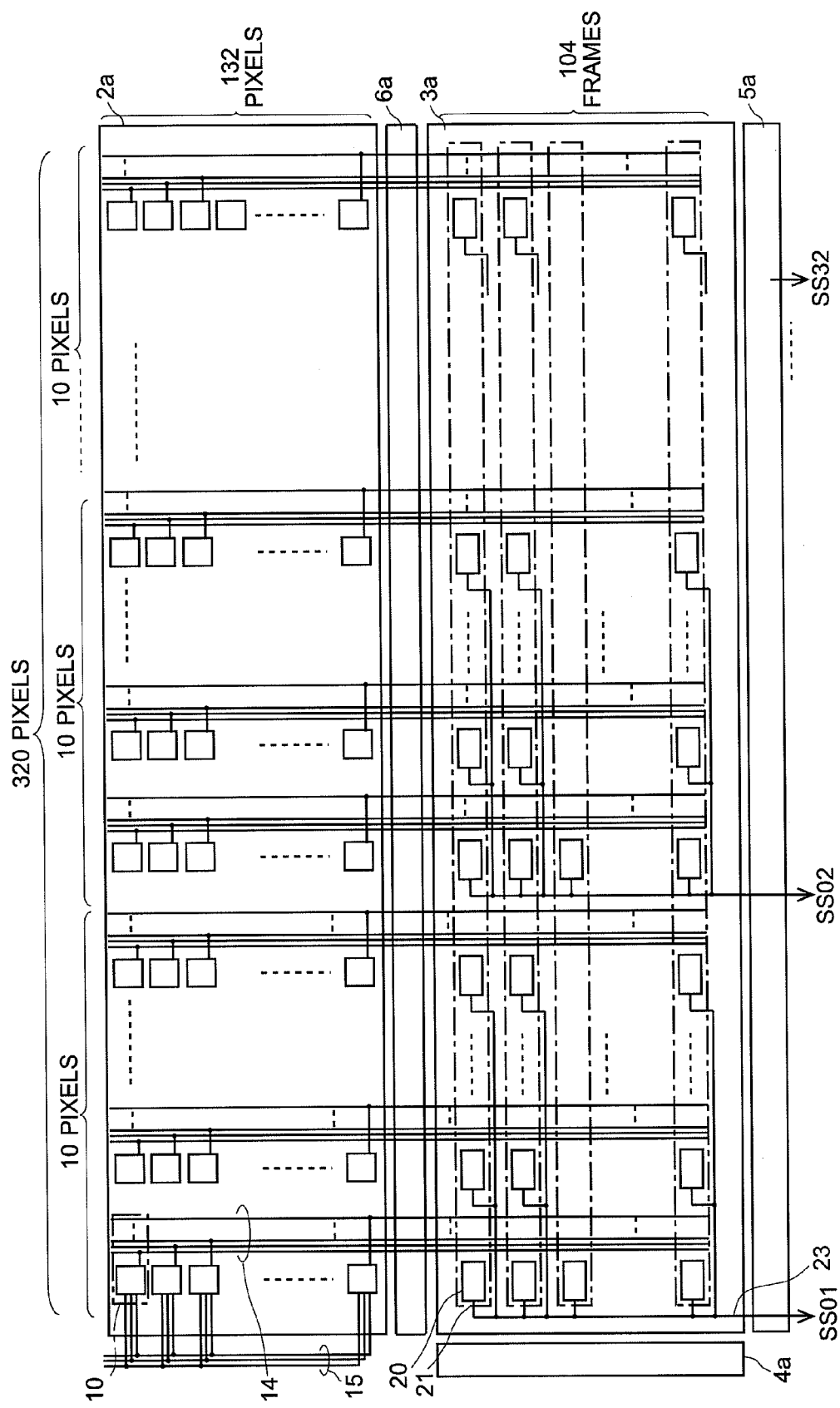
FIG. 4 is a block diagram of the main portion corresponding to approximately one half of the solid-state image sensor of the present embodiment.

An overall configuration and structure of the solid-state image sensor according to the present embodiment is initially described. FIG. 1 is a schematic plan view showing the layout on a semiconductor chip of the solid-state image sensor of the present embodiment, FIG. 3 is a plan view showing a schematic configuration of the pixel area and memory area in the solid-state image sensor of the present embodiment, and FIG. 4 is a block diagram of the main portion corresponding to approximately one-half of the semiconductor chip of the solid-state image sensor of the present embodiment.

As shown in FIG. 1, in the present solid-state image sensor, the pixel area 2 (2a and 2b) for receiving light and producing signals for each pixel and the memory areas 3a and 3b for holding the signals for a predetermined number of frames are not intermixed but completely separated from each other on the semiconductor substrate 1 so that each area forms a definite block. Within the rectangular pixel area 2, a total of N×M pixels 10 consisting of N rows and M columns are arranged in a two-dimensional array. This pixel area 2 is divided into the first pixel area 2a and second pixel area 2b, each of which has (N/2)×M pixels arranged inside.

Below the first pixel area 2a, a first memory area 3a is provided across a first current source area 6a having a small area, while a second memory area 3b is provided above the second pixel area 2b across a second current source area 6b which also has a small area. The first and second memory areas 3a and 3b each include a first or second vertical scan circuit area 4a or 4b and a first or second horizontal scan circuit area 5a or 5b, each circuit area being provided with circuits such as shift resisters and decoders for controlling the reading of signals from the memory area 3a or 3b. As shown in FIG. 3, each memory area 3a or 3b has 64 bundles of output lines SS01-SS64, including 32 bundles at each of the upper and lower ends, for reading signals to the outside of the sensor.

Thus, the solid-state image sensor of the present embodiment is nearly symmetrical with respect to a horizontal border line extending approximately through the center of the pixel area 2 to divide this area into upper and lower sections. The structure and operation of the upper and lower sections are basically identical. Therefore, the following description will be mainly concerned with the structure and operation of the lower section, i.e. the first pixel area 2a, first memory area 3a, first vertical scan circuit area 4a and first horizontal scan circuit area 5a.

The number of pixels, i.e. the values of N and M, can be arbitrarily determined. Increasing these values improves the image resolution but also unfavorably results in either an increase in the entire chip area or a decrease in the chip area per one pixel. In the present example, N=264 and M=320. Accordingly, the number of pixels arranged in each of the first and second pixel areas 2a and 2b is 42240, i.e. 320 pixels in the horizontal direction and 132 pixels in the vertical direction, as shown in FIGS. 3 and 4.

Figure 2:
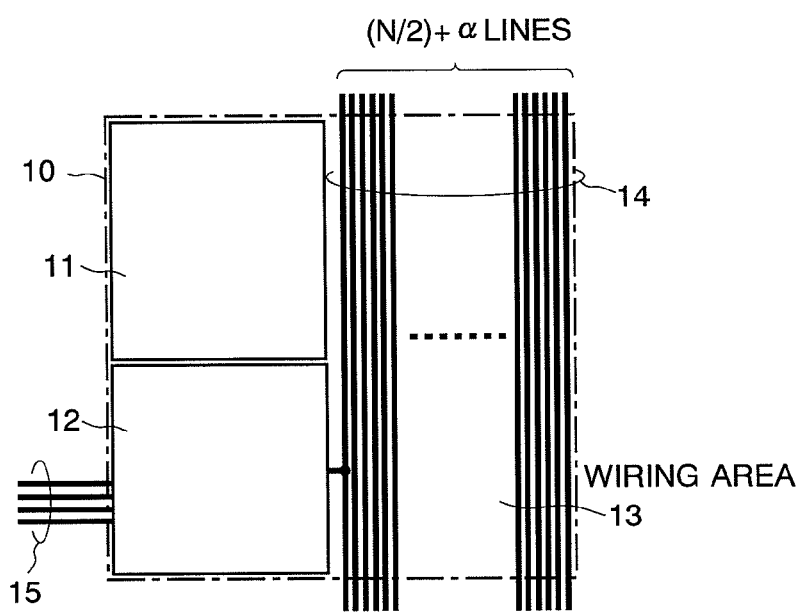
FIG. 2 is a schematic plan view showing the layout of one pixel within a pixel area in the solid-state image sensor of the present embodiment.

FIG. 2 is a schematic plan view showing the layout of one pixel 10 within the pixel area 2 (2a and 2b). One pixel 10 occupies roughly one square area, which is further divided into three areas, i.e. the photoelectric conversion area 11, pixel circuit area 12 and wiring area 13. In the wiring area 13, a bundle of vertically extending (N/2)+α pixel output lines 14 are provided. The value of α may be zero, in which case the number of pixel output lines passing through one wiring area 13 in the present example is 132. However, when a large number of wirings (e.g. aluminum wirings or other kinds of metal wirings) parallel to each other are created, the width of the wires on both ends as well as their parasitic capacitances normally tend to be different. To address these problems, a dummy wire is additionally provided at each end of the 132 pixel output lines which are used to actually pass the signals. In this case, α=2, so that the number of wires passing through one wiring area 13 is 134.

Figure 5:
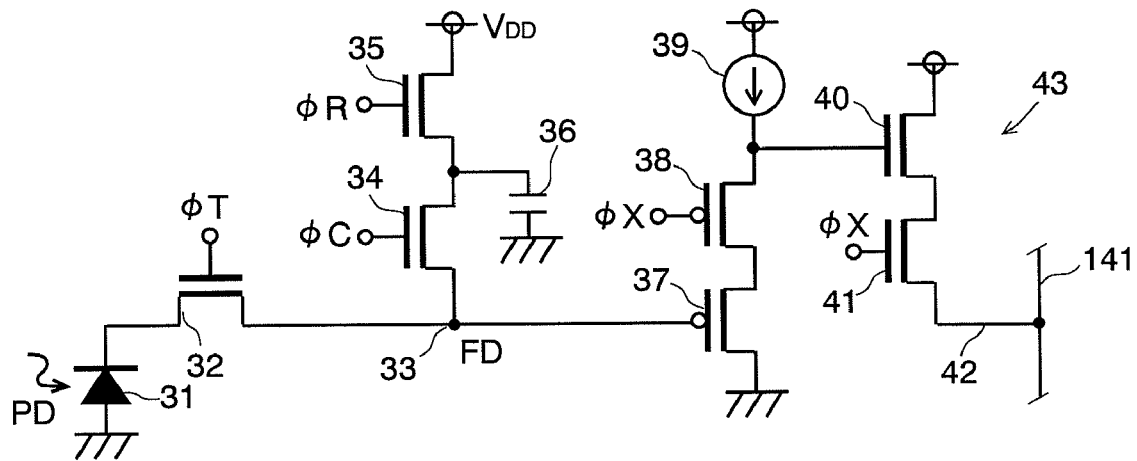
FIG. 5 is a circuit configuration diagram of one pixel in the solid-state image sensor of the present embodiment.

FIG. 5 is a circuit configuration diagram of one pixel 10 shown in FIG. 2. The pixel 10 includes the following elements: a photodiode 31 for receiving light and producing photocharges (this element corresponds to the photoelectric conversion element in the present invention); a transfer transistor 32, which is located near the photodiode 31, for transferring the photocharges (this element corresponds to the transfer element in the present invention); a floating diffusion 33, which is connected to the photodiode 31 via the transfer transistor 32, for temporarily storing the photocharges (this element corresponds to the detection node in the present invention); a storage transistor 34 and storage capacitor 36 for storing charges overflowing from the photodiode 31 through the transfer transistor 32 in the process of storing photocharges; a reset transistor 35 for discharging the charges stored in the floating diffusion 33 and the storage capacitor 36; a source follower amplifier 43 with a two-stage configuration including a pair of cascade-connected PMOS transistors 37 and 38 and another pair of cascade-connected NMOS transistors 40 and 41, for extracting charges stored in the floating diffusion 33 or in both the floating diffusion 33 and the storage capacitor 36 to the outside as voltage signals (this amplifier corresponds to the buffer element in the present invention); and a current source 39, which consists of a constant-current transistor and other components, for supplying current to the transistors 37 and 38 in the first stage of the source follower amplifier 43.

Drive lines 15 for supplying control signals φT, φC, φR and φX are respectively connected to the gate terminals of the transfer transistor 32, storage transistor 34, reset transistor 35, and selection transistors 38 and 41 of the source follower amplifier 43. As shown in FIG. 4, these drive lines are common to all the pixels within the pixel area 2. This configuration enables simultaneous driving at all the pixels.

The output 42 of the selection transistor 41 in the second stage of the source follower amplifier 43 is connected to one of the 132 pixel output lines 14 (i.e. the pixel output line denoted by numeral 141 in FIG. 5) provided in the aforementioned wiring area 13. Such a pixel output line 141 is provided for every pixel 10, i.e. independently for each pixel 10. Therefore, the present solid-state image sensor has as many pixel output lines as the number of pixels, i.e. 84480.

The source follower amplifier 43 functions as a current buffer for driving the pixel output line 141 at high speeds. As shown in FIG. 4, each pixel output line 141 extends from the pixel area 2a to the memory area 3a and hence acts as a considerably large capacitive load. Driving such an element at high speeds requires a large-sized transistor through which high currents can be passed. However, in order to raise the gain of photoelectric conversion to enhance the detection sensitivity in each pixel 10, the floating diffusion 33 for converting photocharges to voltage should preferably have the smallest possible capacitance. The parasitic capacitance of the gate terminal of the transistor connected to the floating diffusion 33 causes an effective increase in the capacitance of the floating diffusion 33. Therefore, for the aforementioned reason, this transistor 37 should preferably be a small-sized transistor with a small gate input capacitance. To fulfill both the supply of high current on the output side and the low capacitance on the input side, the source follower amplifier 43 in the present embodiment has a two-stage configuration, where a small-sized transistor is used as the transistor 37 in the first stage to reduce the input gate capacitance while large-sized transistors are used as the second-stage transistors 40 and 41 to ensure a high output current.

The selection transistor 38 in the first stage of the source follower amplifier 43 is not essential for the basic operation. However, when the second-stage selection transistor 41 is off, this selection transistor 38 can be simultaneously turned off to block the flow of current from the current source 39 into the transistor 37 and thereby suppress the consumption of electric power.

Figure 6:
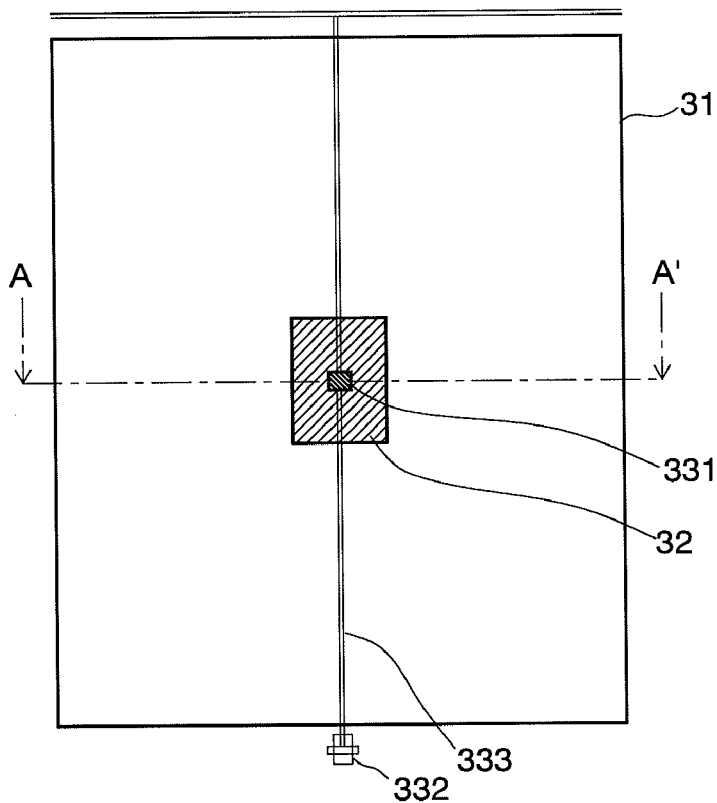
FIG. 6 is a schematic plan view showing the layout of a photoelectric conversion area in one pixel in the solid-state image sensor of the present embodiment.

FIG. 6 is a schematic plan view showing the layout of the photoelectric conversion area 11 in one pixel 10, and FIG. 7 is a schematic potential diagram at the vertical section indicated by the arrowed line A-A' in FIG. 6.

The photodiode 31, which has a photo-receiving surface that is substantially rectangular when viewed from above, has an embedded photodiode structure. In high-speed imaging, the exposure time is extremely short. Therefore, to ensure appropriate exposure, the photodiode of each pixel 10 needs to have the largest possible photo-receiving surface so that it can receive the largest possible amount of incident light. However, increasing the area of the photo-receiving surface of the photodiode normally causes a problem relating to the time required for the photocharges to reach the floating diffusion, i.e. the detection node, particularly for the photocharges produced in the circumferential portion of the photo-receiving surface. This problem can result in a situation where the photocharges that cannot be transferred during the short cyclic period of the high-speed imaging are eventually wasted or cause afterimages. To address these problems, the solid-state image sensor of the present embodiment has adopted a special structure, as hereafter described, to improve the charge-transfer speed.

The floating diffusion is normally placed next to the photodiode. However, as shown in FIG. 6, the present solid-state image sensor has a small-sized floating diffusion 331 located nearly at the center of the photodiode 31, with the ring-shaped gate electrode of the transfer transistor 32 encircling the floating diffusion 331. Placing the floating diffusion 331 at the center of the photodiode 31 in this manner reduces, on average, the moving distance of the photocharges from the circumferential portion of the photodiode 31 to the floating diffusion 331. Accordingly, the photocharges can easily reach the floating diffusion 331 irrespective of where they are generated within the circumferential portion of the photodiode 31.

Furthermore, in the process of creating the photodiode 31, the amount (or depth) of injection (doping) of impurities is changed in stages by using a plurality of photomasks to provide a gradual or stepwise change in the amount of doping (or injection depth) of the impurities from the circumference of the photodiode 31 toward its center (i.e. the floating diffusion 331). Therefore, when an appropriate bias voltage is applied to the pn junction of the photodiode 31, a potential gradient that declines from the circumference of the photodiode 31 toward its center is created, as shown in FIG. 7(a). Due to this intended potential gradient created by a skillfully devised process, a photocharge produced by an incidence of light at a location closer to the circumference of the photodiode 31 is more rapidly accelerated toward the center.

In this process, when the transfer transistor 32 is off, the photocharges are collected around the potential barrier formed immediately below the ring-shaped gate electrode of the transfer transistor 32, as shown in FIG. 7(a). Then, when the transfer transistor 32 is turned on, the collected photocharges will immediately fall into the floating diffusion 331 through the transfer transistor 32, as shown in FIG. 7(b). On the other hand, if the transfer transistor 32 is maintained in the ON state while the light is being received, the photocharges that have gathered at the center along the potential gradient will directly fall into the floating diffusion 331 through the transfer transistor 32. In any of these cases, the photocharges produced by the photodiode 31 are promptly, and with high probability, transferred to the floating diffusion 331.

Although the provision of the floating diffusion 331 at the center of the photodiode 31 offers the previously described significant advantages, the previous configuration causes the problem that the aperture ratio will decrease if another element, such as a storage capacitor 36 for storing photocharges that have overflowed, is placed close to the floating diffusion 331. This problem is avoided in the present embodiment by providing a second floating diffusion 332 as a diffusion layer within the pixel circuit area 12 in addition to the aforementioned floating diffusion 331 which photocharges directly flow into as described previously (this floating diffusion is hereinafter called the first floating diffusion), with a wire 333 made of aluminum (Al) or other kinds of metal connecting the first floating diffusion 331 and the second floating diffusion 332 to equalize their potential. This means that the first floating diffusion 331 and the second floating diffusion 332 integrally function as a floating diffusion 33 which serves as the detection node for converting electric charge signals into voltage signals.

The internal configuration of the first and second memory areas 3a and 3b is hereinafter described in detail. As shown in FIG. 4, each of the first and second memory areas 3a and 3b includes memory section units 20 whose number equals the number L of storage frames. These memory section units 20 are arrayed in the extending direction of the 132 pixel output lines 14 which are respectively connected to the 132 pixels 10 vertically arranged within the pixel area 2a or 2b. In the present example, the number L of storage frames, or the number of frames for continuous imaging, is 104. Accordingly, 104 pieces of memory section units 20 are vertically arranged to form a column, and 320 copies of this column are arranged horizontally. Thus, the first memory area 3a has 104×320=33280 pieces of memory section units 20 arranged inside. The second memory area 3b also has the same number of memory section units 20.

FIG. 8 is a schematic diagram showing the internal configuration of one memory section unit 20. Each memory section unit 20 includes a total of 132 memory sections 22 forming an array with 12 rows and 11 columns. Each memory section 20 is connected to a different pixel output line 141. The pixel output lines 141 establish a one-to-one relation between the memory sections 22 and the pixels 10 within the pixel area 2a. The 132 memory sections 22 within one memory section unit 20 hold output signals received from the 132 pixels forming one column within the pixel area 2a. Therefore, the 320 memory section units 20 forming one horizontal row in FIG. 4 (i.e. the row of memory section units denoted by numeral 21 in FIG. 4) will hold the pixel signals of the lower half of one frame consisting of 132×320 pixels. Similarly, in the second memory area 3b located above in FIG. 3, the pixel signals of the upper half of one frame consisting of 132×320 pixels will be held by 320 memory section units 20 forming one horizontal row. Combining those two sets of signals produces one frame of image. With the vertically arranged 104 rows of memory section units, the present device can hold 104 frames of pixels signals.

As shown in FIG. 8, all outputs of the 132 memory sections 22 in each memory section unit 20 are connected together to form one signal output line 23. Furthermore, as shown in FIG. 4, the horizontally arranged memory section units 20 are divided into groups each consisting of ten neighboring memory section units 20. Thus, 32 groups of memory section units 20 are horizontally arranged, where the signal output lines 23 of the ten memory section units 20 in each group are connected together to form a single line. The signal output lines 23 of the vertically arranged 104 memory section units 20 are also connected together to form a single line. As a result, the outputs of 1040 memory section units 20 arrayed in 10 columns and 104 rows, or the outputs of 137280 memory sections 22 included in those memory section units 20, are connected together to form one signal output line 23 in the memory area 3a. In FIG. 3, a memory section unit block, which is a collection of the memory section units 20 sharing the same signal output line 23, is denoted by numeral 50. The configuration described to this point results in 32 signal output lines 23 extracted from the first memory area 3a and the same number of signal output lines 23 extracted from the second memory area 3b. The signals extracted through these signal output lines are denoted by numerals SSO1-SS64.

Figure 9:
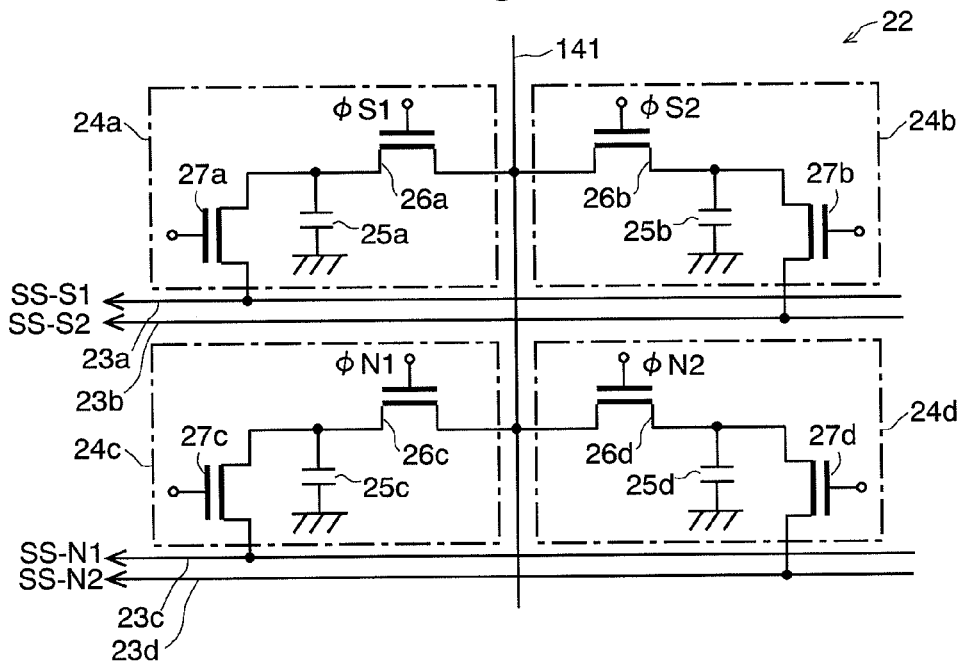
FIG. 9 is a circuit configuration diagram of one memory section in the solid-state image sensor of the present embodiment.

FIG. 9 is a schematic circuit diagram of one memory section 22. One memory section 22 has four memory units. Each memory element 24 (24a-24d), which serves as a memory unit, is composed of a sampling transistor 26 (26a-26d) connected to one pixel output line 141, a capacitor 25 (25a-25d) connected via the sampling transistor 26 to the pixel output line 141, and a reading transistor 27 (27a-27d) for reading an analogue voltage signal held in the capacitor 25. One memory section 22 consists of the combination of these four memory elements 24 (24a-24d). Accordingly, each memory section 22 can hold four different analogue voltage signals extracted from the same pixel through the same pixel output line 141. The signal output lines 23a-23d via the four reading transistors 27a-27d are independent of each other. This means that the signal output line 23 shown in FIGS. 3, 4 and 8 actually consists of four lines, which are configured so that an analogue process, such as differencing, is performed inside the sensor and the resultant signal is extracted through one signal output line 23 to the outside of the sensor. Alternatively, the four signal output lines 23a-23d may be independently extracted to the outside.

The original purpose of building each memory section 22 from four memory elements 24a-24d is to independently hold a signal corresponding to the charge before an overflow, a signal corresponding to the charge after an overflow, a noise signal contained in the signal corresponding to the charge before an overflow and a noise signal contained in the signal corresponding to the charge after an overflow, in order to perform a dynamic range increasing process and noise removing process, which will be described later. However, it is not always necessary to persist on this purpose; the memory elements 24a-24d can also be used in other operational modes. For example, if the storage capacitor 36 of each pixel 10 is not used, there is no need to consider the signal corresponding to the charge after an overflow and the noise signal contained in the signal after the overflow, in which case the corresponding memory elements 24 can be used to increase the number of frames for continuous imaging. As a result, the possible number of frames for continuous imaging will be doubled to 208. If the noise removal is also unnecessary, the possible number of frames for continuous imaging will be further doubled to 416.

Similar to the storage capacitor 36 in the pixel 10, the capacitors 25a-25d can be created, for example, by a double polysilicon gate structure or stack structure. Using a CCD structure to hold electric charges would cause the problem that an aliasing due to dark charges caused by thermal excitation or other factors would be added to the photo signal. The capacitors 25a-25d in the form of a double polysilicon gate structure or stack structure cause no such dark charges and hence no addition of aliasing, thus improving the S/N ratio of the signals to be extracted to the outside.

Figure 10:
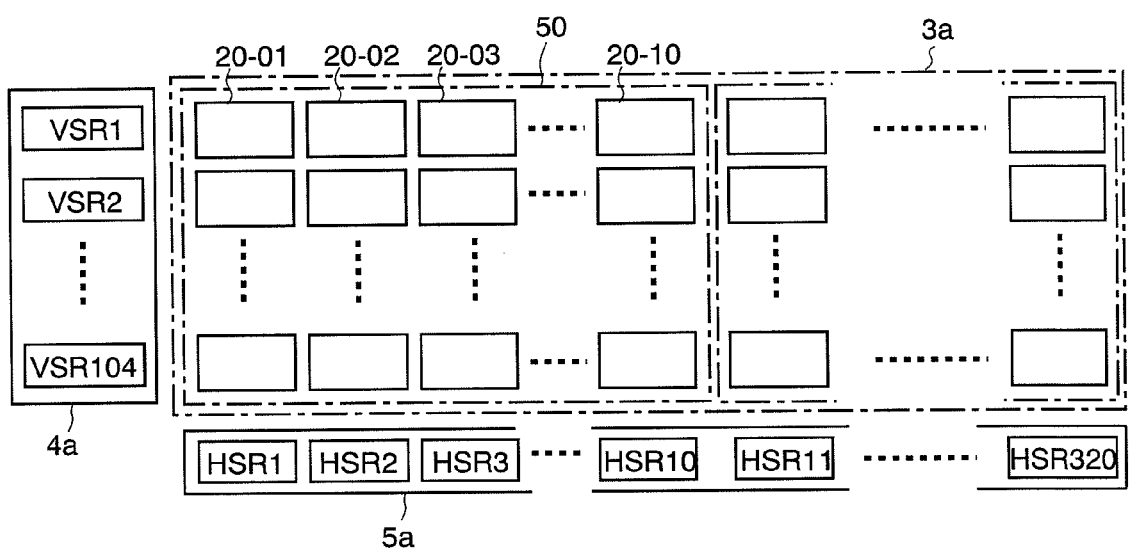
FIG. 10 is a block diagram showing a schematic configuration for reading signals held in the memory sections through output lines in the solid-state image sensor of the present embodiment.

FIG. 10 is a block diagram showing a schematic configuration for reading signals held in the memory sections within the memory area 3a through the aforementioned signal output line 23. There are horizontal shift registers HSR1-HSR320 provided for each vertical column of the memory section units 20 (20-01 to 20-10) arranged in a two-dimensional array, and vertical shift registers VSR1-VSR104 provided for each horizontal row. In a sequential reading, one memory section unit 20 is selected by a combination of the horizontal shift registers HSR1-HSR320 and vertical shift registers VSR1-VSR104. Within the selected memory section unit 20, the memory sections 22 are sequentially selected to extract pixel signals one after another. It should be noted that understanding the reading operation requires considering only the operation inside one memory section unit block 50 since different memory section unit blocks 50 having separate signal output lines 23 can be concurrently operated.

The drive methods and operations of the solid-state image sensor of the present embodiment are hereinafter described. The solid-state image sensor of the present embodiment has two major drive modes, i.e. the continuous reading mode and burst reading mode. The following description initially explains schematic operations of these two drive modes with reference to FIG. 11. FIG. 11 is a schematic time chart of the continuous reading mode and burst reading mode.

(A) Continuous Reading Mode

The basic form of the continuous reading mode is as shown in FIG. 11(a): After the photocharges for one frame are stored in the pixels within the pixel areas 2 (2a and 2b), the signals are collectively read at all the pixels 10 through the corresponding pixel output lines 141, and then these signal charges are held by the capacitors 25 of the memory sections 22. Thus, the pixel signals for one frame are completely arranged in the memory sections 22 of the memory areas 3a and 3b. Subsequently, the horizontal shift registers and vertical shift registers are driven in the previously described manner to sequentially read one frame of pixel signals and extract them to the outside. This process uses only the 320 memory section units 20 belonging to the topmost row within the memory area 3a.

If the frequency of the clock signal for driving the horizontal and vertical shift registers is 50 MHz, the reading time for one pixel signal is 0.02 μsec. The topmost row of one memory section unit block 50 has 132×10=1320 memory sections 22, for which the reading time amounts to 26.4 μsec. As described previously, the reading operation can be simultaneously performed at different memory section unit blocks 50. Therefore, the process of reading one frame of pixel signals can be completed in 26.4 μsec. This also means that the photocharge storage time can be extended to this period of time, thus offering a greater degree of freedom of setting the photocharge storage time as compared to the burst reading mode, which will be described later.

The example of FIG. 11(a) is concerned with only one frame. However, since the pixel areas 2a and 2b and the memory areas 3a and 3b can be independently operated except when output signals are transferred between them through the pixel output lines 14, the storage of photocharges in the pixel areas 2a and 2b can be performed simultaneously with the sequential reading of pixel signals from the memory areas 3a and 3b. Accordingly, as shown in FIG. 11(b), it is possible to almost continuously repeat the imaging operation.

(B) In the Case of Burst Reading Mode

In the burst reading mode, as shown in FIG. 11(c), the following process is repeated: After the photocharges for one frame are stored in each pixel without performing sequential reading of the pixel signals, the signals are collectively read at all the pixels through the corresponding pixel output lines, and then the signal charges are held by the capacitors 25 of the memory sections 22. In this step, the output signals are sequentially stored, one frame after another, into the memory sections 22 prepared for 104 frames. Then, these pixel signals corresponding to the predetermined number of frames are sequentially read and outputted to the outside. The burst reading mode does not include the step of reading signals to the outside during the imaging operation and hence is free from the limitation on the frame rate due to the upper limit of the clock frequency for the reading operation. Therefore, it is possible to continuously take images at extremely short intervals of time. The practically achievable maximum frame rate is mainly limited by the time required for the photocharges produced in the photodiode 31 to be collected and transferred to the floating diffusion 33. As already explained, the structure of the photodiode and other features of the solid-state image sensor in the present embodiment are designed to deal with a possible decrease in the amount of light during the storage of photocharges. Therefore, it is possible to perform high-speed imaging at frame rates higher than one million frames per second, i.e. a level that has been practically achieved by conventional in-situ storage image sensors.

A detailed method of driving the solid-state image sensor of the present invention is hereinafter described, where the process from the photoelectric conversion in each pixel 10 through the storage of the resultant signal in one memory section 22 is initially described with reference to FIGS. 12 to 15.

The solid-state image sensor of the present invention offers two different options for the drive mode: one drive mode is for a short photocharge storage time and the other for a relatively long photocharge storage time. As a rough guide, the former mode is suitable for a photocharge storage time shorter than a range from 10 to 100 μsec, i.e. in the case where the amount of dark charges that generates in the transfer transistor 32 is negligible. This drive mode can be preferably used when the imaging is performed at a high rate of one million frames per second or higher.

(A) Drive Mode for Short Photocharge Storage Time

Figure 12:
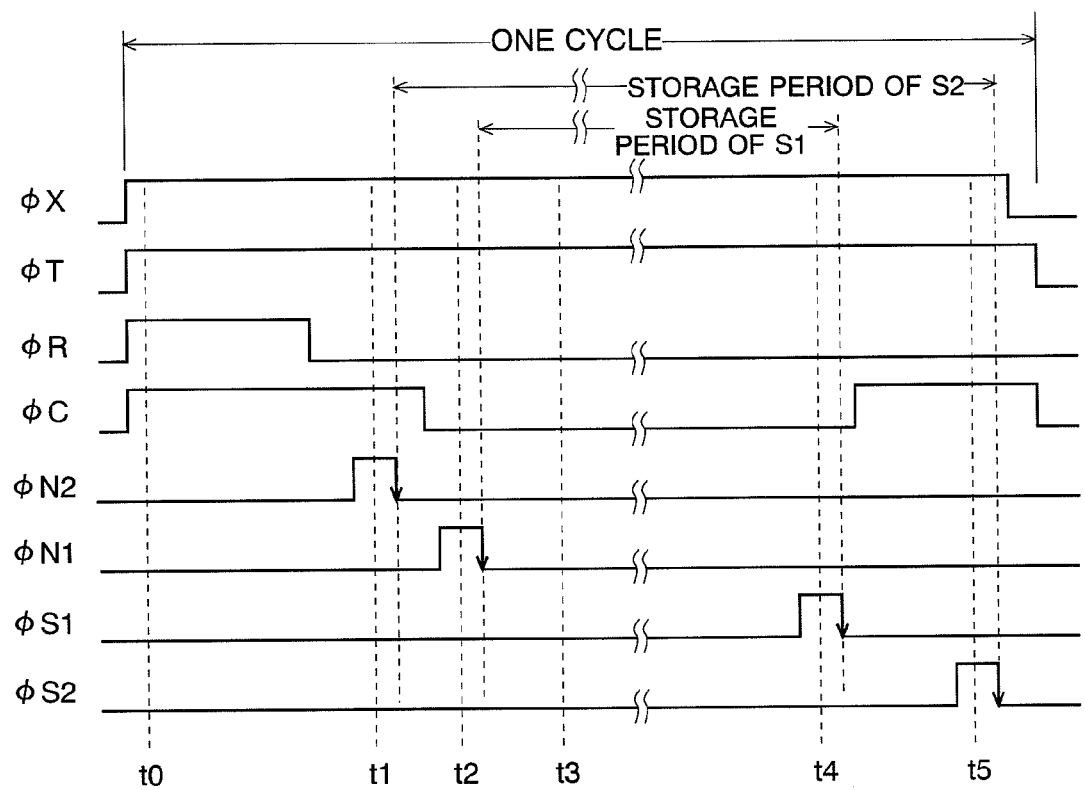
FIG. 12 is a drive timing chart of an operation mode of the solid-state image sensor of the present embodiment in the case where the photocharge storage time is short.
Figure 13:
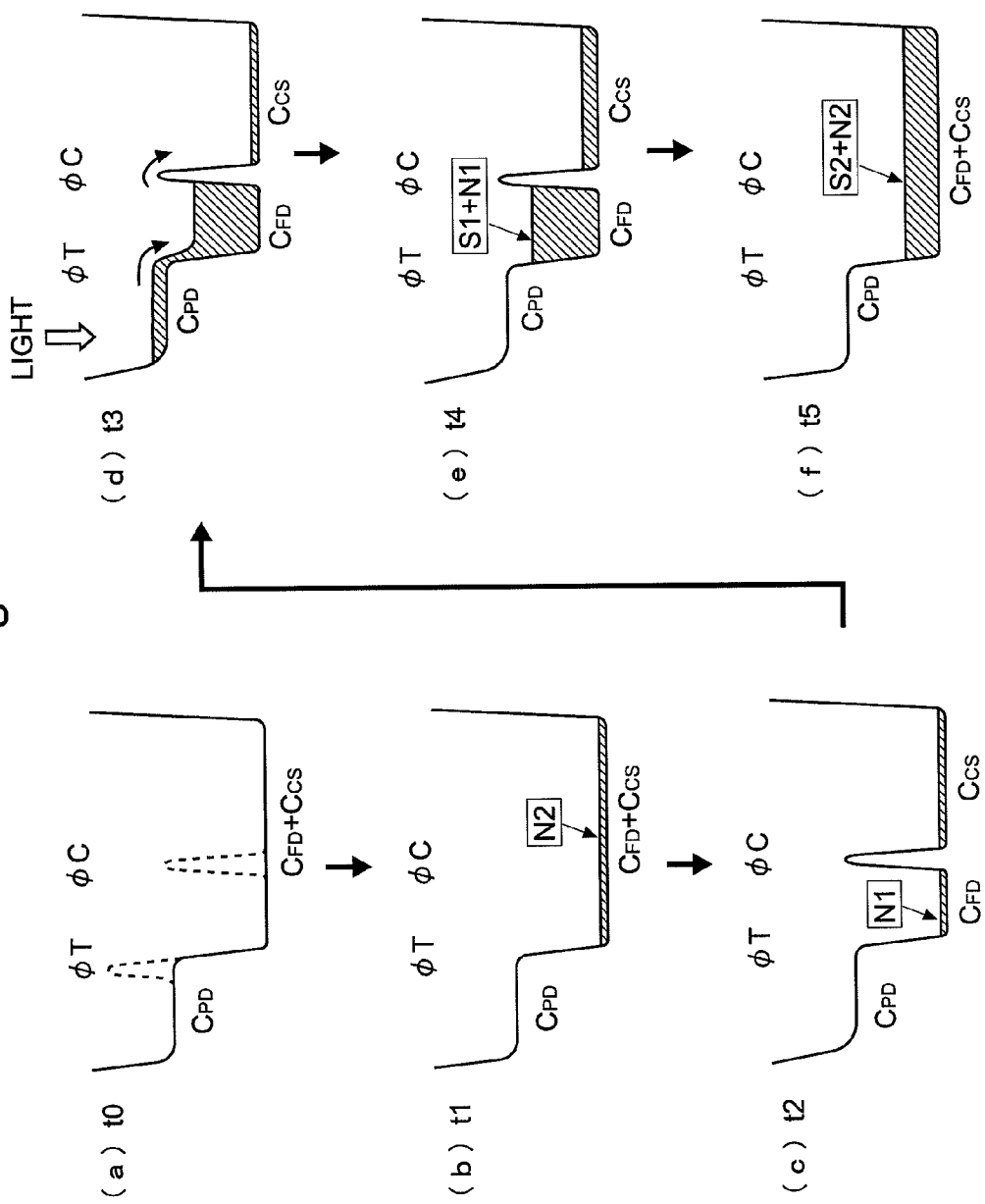
FIG. 13 is a schematic potential diagram inside a pixel during the operation shown in FIG. 12.

FIG. 12 is a drive timing chart of the operation mode for a short photocharge storage time, and FIG. 13 is a schematic potential diagram inside each pixel 10 during this drive mode. In FIG. 13 (and in FIG. 15 to be mentioned), $C_{PD}$, $C_{FD}$ and $C_{cs}$ denote the capacitances of the photodiode 31, floating diffusion 33 and storage capacitor 36, respectively, and $C_{FD}+C_{CS}$ denotes the combined capacitance of the floating diffusion 33 and storage capacitor 36.

The signal $\phi X$, which is a common control signal supplied to every pixel 10, is set to a high level to maintain both the selection transistors 38 and 41 within the source follower amplifier 43 in the ON state. Before the photocharge storage is performed, the signals $\phi T$, $\phi C$ and $\phi R$, which are also common control signals, are set to a high level to turn on the transfer transistor 32, storage transistor 34 and reset transistor 35 (time t0), whereby the floating diffusion 33 and storage capacitor 36 are reset (or initialized). At this point in time, the photodiode 31 is completely depleted. The potential at this point in time is shown in FIG. 13(a).

Next, $\phi R$ is set to a low level to turn off the reset transistor 35, whereupon a noise signal N2, which equivalently contains a random noise generating in the floating diffusion 33 and storage capacitor 36 and a fixed pattern noise resulting from a variation in the threshold voltage of the transistor 37 in the source follower amplifier 43, is generated in the floating diffusion 33 (refer to FIG. 13(b)), and an output corresponding to this noise signal N2 appears in the pixel output line 141. At this timing (time t1), a sampling pulse $\phi N2$ is given to the memory section 22 to turn on the sampling transistor 26d so that the noise signal N2 outputted through the pixel output line 141 is brought into and held by the capacitor 25d.

Subsequently, $\phi C$ is set to the low level to turn off the storage transistor 34, whereupon the signal charges stored in the floating diffusion 33 and storage capacitor 36 at this point in time are distributed to the floating diffusion 33 and the storage capacitor 36 according to the ratio of their capacitances $C_{FD}$ and $C_{CS}$ (refer to FIG. 13(c)). In this state, a noise signal N1, which contains a random noise generated when $\phi C$ was turned off and a fixed pattern noise resulting from a variation in the threshold voltage of the transistor 37 in the source follower amplifier 43, is generated in the floating diffusion 33, and an output corresponding to this noise signal N1 appears in the pixel output line 141. At this timing (time t2), a sampling pulse $\phi N1$ is given to the memory section 22 to turn on the sampling transistor 26c so that the noise signal N1 outputted through the pixel output line 141 is brought into and held by the capacitor 25c.

Since the transfer transistor 32 is maintained in the ON state, the photocharges generated by light falling onto the photodiode 31 flow through the transfer transistor 32 (this state is shown in FIG. 7(b)) into the floating diffusion 33, and are stored in the floating diffusion 33, being superimposed on the noise signal N1 (time t3). If the floating diffusion 33 is saturated due to a large amount of photocharges produced in the photodiode 31 by strong incident light, the overflowing charges are stored through the storage transistor 34 into the storage capacitor 36 (refer to FIG. 13(d)). Setting the threshold voltage of the storage transistor 34 at an appropriately low level enables those charges to be efficiently transferred from the floating diffusion 33 to the storage capacitor 36. By this method, it is possible to effectively utilize the saturated charges without discarding them even if the floating diffusion 33 has a small capacitance $C_{FD}$ and can store only a small amount of charges in the maximally saturated state. In this manner, both the charges produced before charge saturation (overflow) at the floating diffusion 33 and those produced after charge saturation (overflow) can be reflected in the output.

After a predetermined photocharge storage time (exposure time) has elapsed, a sampling pulse $\phi S1$ is given to the memory section 22, with the storage transistor 34 in the OFF state, to turn on the sampling transistor 26a, whereby a signal corresponding to the charge stored in the floating diffusion 33 at that point in time (time t4) is extracted through the pixel output line 141 and held in the capacitor 25a (refer to FIG. 13(e)). The signal stored in the floating diffusion 33 at this point in time results from the superposition of a noise signal N1 and a signal S1 corresponding to the charge before an overflow. Accordingly, the signal held in the capacitor 25a equals S1+N1, which does not reflect the amount of charge stored in the storage capacitor 36.

Immediately after that, $\phi C$ is set to the high level to turn on the storage transistor 34, whereupon the charge held in the floating diffusion 33 at that point in time is mixed with the charge held in the storage capacitor 36 (refer to FIG. 13(f)). In this state, a sampling pulse $\phi S2$ is given to the memory section 22 to turn on the sampling transistor 26b (time t5), whereby a signal corresponding to the charges held in the floating diffusion 33 and the storage capacitor 36, i.e. a signal resulting from the superposition of the noise signal N2 and the signal S2 after the overflow, is extracted through the pixel output line 141 and held in the capacitor 25b. Accordingly, the signal to be held in the capacitor 25b is S2+N2, which reflects the amount of charge stored in the storage capacitor 36.

By the process described to this point, the signals S1+N1, S2+N2, N1 and N2 are respectively held in the four capacitors 25a, 25b, 25c and 25d included in one memory section 22. Thus, one cycle of the image signal acquisition operation is completed. As already explained, the noise signals N1 and N2 containing the random noise and fixed pattern noise are obtained separately from the other signals containing these noise signals. These signals can be respectively read from the capacitors 25a, 25b, 25c and 25d and then subjected to a subtracting operation by an analogue computing circuit (not shown) to obtain high S/N image signals free from the influence of the noise signals N1 and N2. Since the charges that have overflowed from the floating diffusion 33 are not discarded but utilized, even a strong incident light barely causes saturation, so that the resultant signal can reflect the light. Thus, a wide dynamic range is ensured. The possibilities of widening the dynamic range in this manner are described in detail in the Japanese Unexamined Patent Application Publication No. 2006-245522 and other documents. Therefore, no explanation will be made in this specification.

(B) Operation Mode for Relatively Long Photocharge-Storage Time

Figure 14:
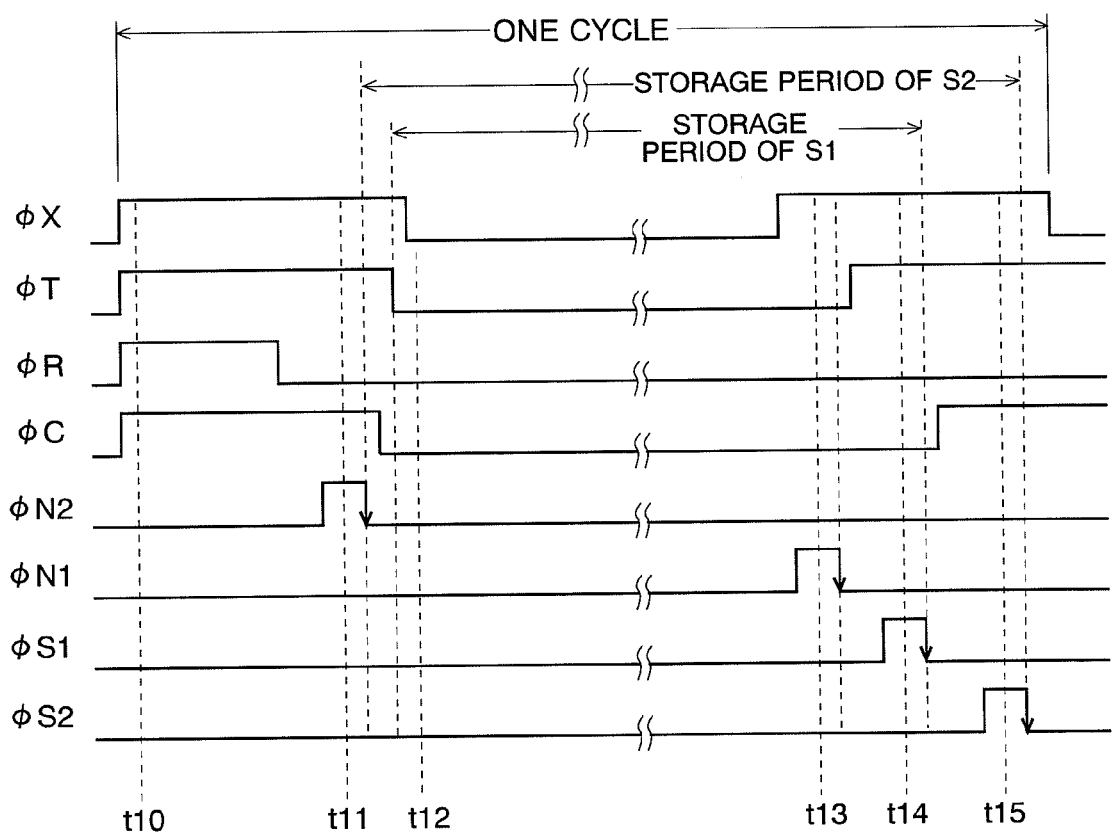
FIG. 14 is a drive timing chart of the solid-state image sensor of the present embodiment in the case where the photocharge storage time is relatively long.
Figure 15:
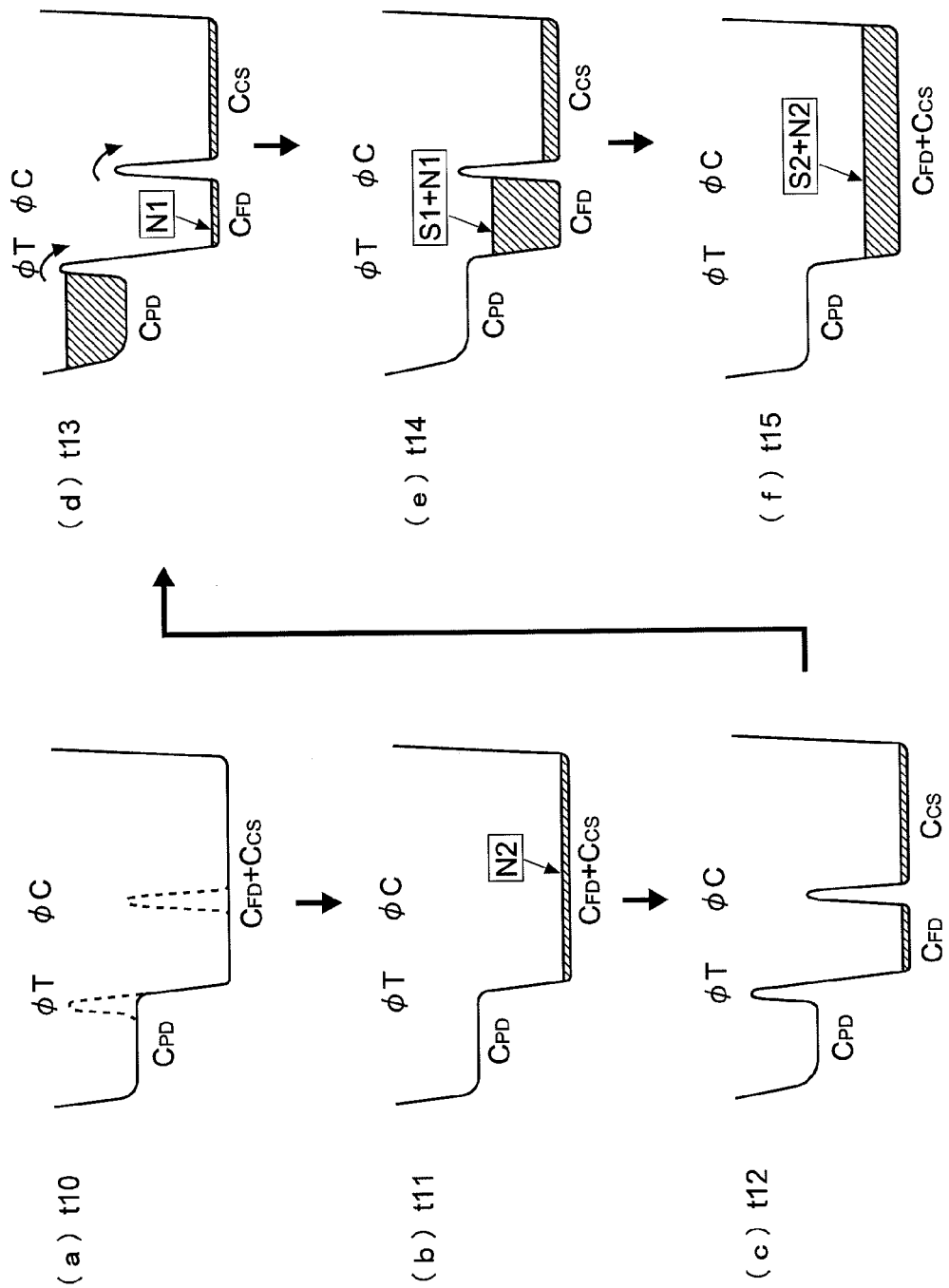
FIG. 15 is a schematic potential diagram inside a pixel during the operation shown in FIG. 14.

An operation for a relatively long photocharge storage time is hereinafter described. FIG. 14 is a drive timing chart in the case where the photocharge storage time is relatively long, and FIG. 15 is a schematic potential diagram inside the pixel 10 in this operation.

The most significant difference from the case of the short photocharge storage time exists in many points. For example, the transfer transistor 32 is turned off during the photocharge storage period so that the photocharges produced in the photodiode 31 will be stored in a depletion layer; the transfer transistor 32 is turned off during the photocharge storage period; and the sampling of the noise signal N1 is performed at the end of the photocharge storage period so that the dark charges (and photocharges) that generate in the floating diffusion 33 will not be included in the signal S1. The purpose of turning off the transfer transistor 32 is to create an accumulation state at the interface between the silicon and insulating film immediately below its gate, thus filling the silicon surface with holes to prevent intrusion of dark charges through the interface between the silicon and insulating film. Another difference is that, taking into account the long photocharge storage time, the selection transistors 38 and 41 of the source follower amplifier 43 are turned off for a predetermined period of time to reduce the power consumption.

Before the photocharge storage is performed, φT, φC and φR are set to high levels to turn on both the storage transistor 34 and reset transistor 35 (time t10), whereby the floating diffusion 33 and storage capacitor 36 are reset (or initialized). At this point in time, the photodiode 31 is completely depleted. The state of potential at this point in time is shown in FIG. 15(a). Next, φR is set to the low level to turn off the reset transistor 35, whereupon a noise signal N2, which equivalently contains a random noise generating in the floating diffusion 33 and the storage capacitor 36 and a fixed pattern noise resulting from a variation in the threshold voltage of the transistor 37 in the source follower amplifier 43, is generated in the floating diffusion 33 (refer to FIG. 15(b)), and an output corresponding to this noise signal N2 appears in the pixel output line 141. At this timing (time t11), a sampling pulse φN2 is given to the memory section 22 to turn on the sampling transistor 26d, whereby the noise signal N2 is extracted through the pixel output line 141 and held in the capacitor 25d. The operations to this point are identical to those of the previously described operation mode for a short photocharge storage time.

Next, φC is set to the low level to turn off the storage transistor 34, whereupon the signals stored in the floating diffusion 33 and storage capacitor 36 at this point in time are distributed to the floating diffusion 33 and storage capacitor 36 according to the ratio of their capacitances $C_{FD}$ and $C_{CS}$. Furthermore, φT is set to the low level to turn off the transfer transistor 32, and φX is also set to the low level to turn off the two selection transistors 38 and 41 of the source follower amplifier 43 (time t12). As a result, a potential barrier is formed between the photodiode 31 and the floating diffusion 33, creating a condition where photocharges can be stored in the photodiode 31 (refer to FIG. 15(c)).

The photocharges produced by incident light falling onto the photodiode 31 are stored in the photodiode 31. When a charge saturation occurs in the photodiode 31, excessive charges overflow through the transfer transistor 32, to be stored in the floating diffusion 33 and superimposed on the noise signal that has been distributed as described previously. If the floating diffusion 33 is saturated by stronger incident light, the overflowing charges will be stored through the storage transistor 34 into the storage capacitor 36 (refer to FIG. 15(d)).

Setting the threshold voltage of the storage transistor 34 at a level appropriately lower than that of the transfer transistor 32 enables the charges saturated in the floating diffusion 33 to be efficiently transferred from the floating diffusion 33 to the storage capacitor 36 without being returned to the photodiode 31. By this method, it is possible to effectively use the saturated charges without discarding them even if the floating diffusion 33 has a small capacitance and can store only a small amount of charges. In this manner, both the charges produced before the overflow at the floating diffusion 33 and those produced after the overflow can be reflected in the output.

After a predetermined photocharge storage time has elapsed, φX is set to the high level to turn on the selection transistors 38 and 41, after which a sampling pulse φN1 is given to the memory section 22 to turn on the sampling transistor 26c, whereby a noise signal N1 corresponding to the signal charge stored in the floating diffusion 33 at this point in time (time t13) is extracted through the pixel output line 14 and held in the capacitor 25c. The noise signal N1 at this point in time contains a fixed pattern noise due to a variation in the threshold voltage of the transistor 37 in the source follower amplifier 43. It should be noted that this signal contains not only the noise but also a portion of the photocharges produced by photoelectric conversion, which are also regarded as a noise in the present case.

Next, φT is set to the high level to turn on the transfer transistor 32, whereupon the photocharges stored in the photodiode 31 are completely transferred to the floating diffusion 33 (refer to FIG. 15(e)). Immediately after that (time t14), a sampling pulse φS1 is given to the memory section 22 to turn on the sampling transistor 26a, whereby a signal corresponding to the charge stored in the floating diffusion 33 is extracted through the pixel output line 14 and held in the capacitor 25a. This signal results from the superposition of the aforementioned noise signal N1 and the signal corresponding to the charge stored in the photodiode 31, i.e. the signal S1 before the overflow, and hence equals S1+N1.

Subsequently, φC is set to the high level to turn on the storage transistor 34, whereupon the charge held in the floating diffusion 33 at that point in time is mixed with the charge held in the storage capacitor 36 (refer to FIG. 15(f)). In this state, a sampling pulse φS2 is given to the memory section 22 to turn on the sampling transistor 26b (time t15), whereby a signal corresponding to the charges held in the floating diffusion 33 and storage capacitor 36 are extracted through the pixel output line 141 and held in the capacitor 25b. This signal equals S2+N2.

As a result of the processes described to this point, the signals S1+N1, S2+N2, N1 and N2 are respectively held in the four capacitors 25a, 25b, 25c and 25d included in one memory section 22. Thus, one cycle of image signal acquisition is completed. As in the case of the operation mode for the short photocharge storage time, the noise signals N1 and N2 containing the random noise and fixed pattern noise are obtained separately from the other signals containing these noise signals. Therefore, these signals can be respectively read from the capacitors 25a, 25b, 25c and 25d and then subjected to subtraction or other analogue computing to obtain high S/N image signals free from the influence of the noise signals N1 and N2. Since the charges that have overflowed from the floating diffusion 33 are not discarded but utilized, even a strong incident light barely causes saturation, so that the resultant signal can reflect the light. Thus, a wide dynamic range is ensured.

As described previously, the control signals φX, φT, φR and φC supplied to each pixel 10 are common to all the pixels. Therefore, the aforementioned operations of storing photocharges and transferring signals from each pixel 10 to the memory section 22 are simultaneously performed at all the pixels 10. That is, by one cycle of these operations, one frame of image signals are held in the memory sections 22 in the memory section unit row 21 in FIGS. 3 and 4. In the burst reading mode, the operations are repeated 104 cycles to store the image signals in the memory sections 22 in the entire memory section unit rows 21. In the $105^{th}$ and subsequent cycles, the operation of writing signals in the memory sections 22 is once more initiated from the topmost memory section unit row 21. Thus, the signal-holding operation is cyclically carried out. This process is continued, for example, until a command signal for discontinuation the imaging is given from either an internal circuit or external system. When the command signal for discontinuation the imaging is given and the imaging is thereby discontinued, the latest 104 frames of image signals are held in the memory areas 3a and 3b. By sequentially reading these signals, a series of image signals corresponding to 104 frames can be obtained.

When, as described previously, new signals are to be held in the capacitors 25 of a memory section 22 in which some signals are already present, it is necessary to reset the capacitors to discard those older signals. For this purpose, though not shown in the figures, a transistor for resetting is connected to each pixel output line 141. To reset the capacitor 25 of a given memory section 20, the sampling transistor 26 of the memory section 20 is turned on and, simultaneously, the transistor for resetting connected to the corresponding pixel output line 141 is turned on, whereby the signal stored in the capacitor 25 is reset through the sampling transistor 26 and the pixel output line 141. After this resetting operation is performed, a new signal is held in the capacitor 25.

Figure 16:
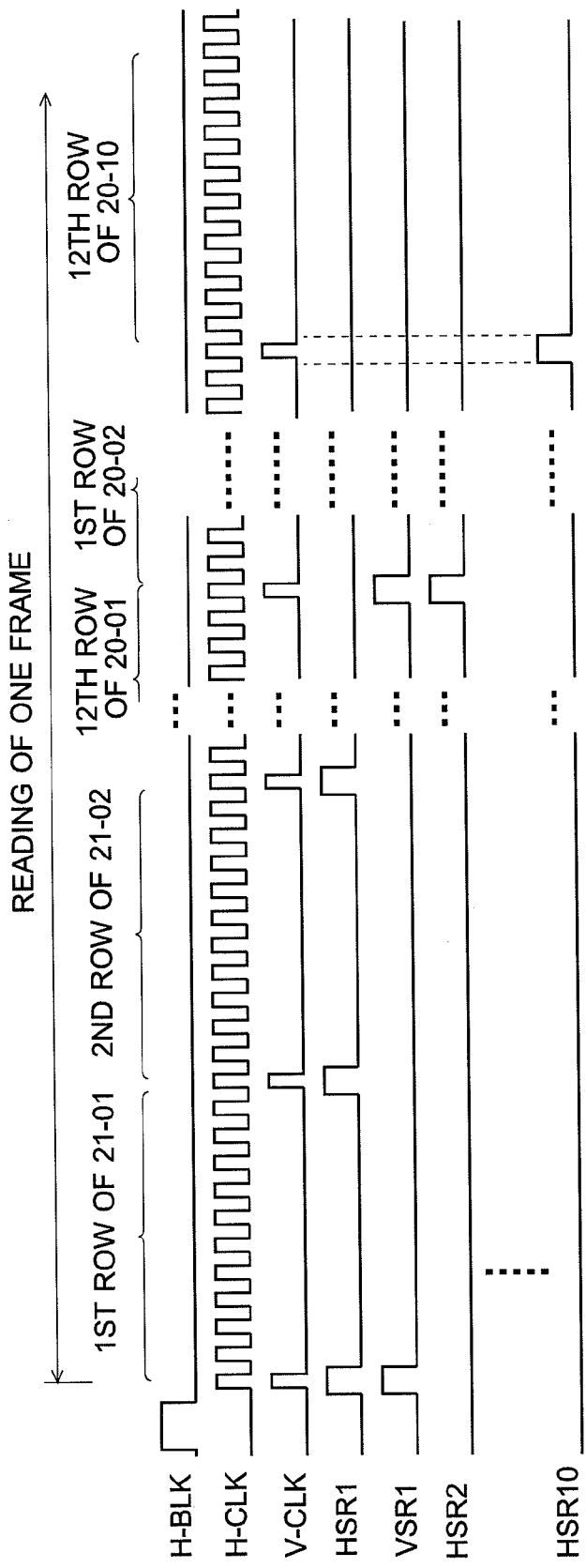
FIG. 16 is an operation timing chart of sequential reading for one frame in the continuous reading mode of the solid-state image sensor of the present embodiment.

The operation of sequentially reading signals from the memory areas 3a and 3b is hereinafter described. FIG. 16 is an operation timing chart of sequential reading for one frame in the continuous reading mode, FIG. 17 is an operation timing chart of sequential reading in the burst reading mode, FIG. 18 is an operation timing chart of the main portion of the horizontal shift registers HSR, and FIG. 19 is an operation timing chart of the main portion of the vertical shift registers VSR.

The signals held in the capacitors 25 of each memory section 22 are read by sequentially turning on the reading transistors 27 connected to the same signal output line 23. Since the four reading transistors 27a-27d of the same memory section 22 are respectively connected to the different signal output lines 23a-23d, the signals held in each of the four capacitors 25a-25d in the same memory section 22 can be simultaneously read. Using these signals, the subtracting operations of (S1+N1)−N1 and (S2+N2)−N2 can be performed by a subtraction circuit (now shown), to separately extract the signals S1 and S2 free from the random noise and fixed pattern noise. Which of S1 and S2 should be used is determined using an appropriate reference (threshold) signal level equal to or lower than the saturation level of the signal S1; S1 is selected when the signal is equal to or higher than the reference level, and S2 when the signal is lower than the reference level. By performing this selection below the signal saturation level, it is possible to avoid the influence of saturation variation of the signal S1.

As one example, the reading order at the leftmost memory section unit block 50 in the 320 memory section units 20 corresponding to the first frame in FIG. 10 is hereinafter described. In the leftmost memory section unit 20-01, image signals of eleven pixels are sequentially read from the memory sections 22 in the left-to-right direction of the first horizontal row shown in FIG. 8. This memory section unit 20-01 is selected by activating the horizontal shift register HSR1 and vertical shift register VSH1. The horizontal reading clock H-CLK produces a moving pulse signal that turns on the reading transistors 27 of the memory sections 22, one by one, from left to right in the horizontal direction. The signals y1, y2 and y3 in FIG. 18 are one example of this pulse signal. After the reading of one row is completed, a clock V-CLK for shifting the vertical reading position is supplied, whereby the memory sections 22 in the next (second) row are selected. Then, these memory sections 22 are similarly selected, from left to right, for the reading of eleven pixels. Such a process of reading pixel signals is repeated until the end of the twelfth row. The signals v1, v2 and v3 shown in FIG. 19 are one example of the signal for activating the reading transistor 27 corresponding to each row in the vertical direction.

Figure 17:
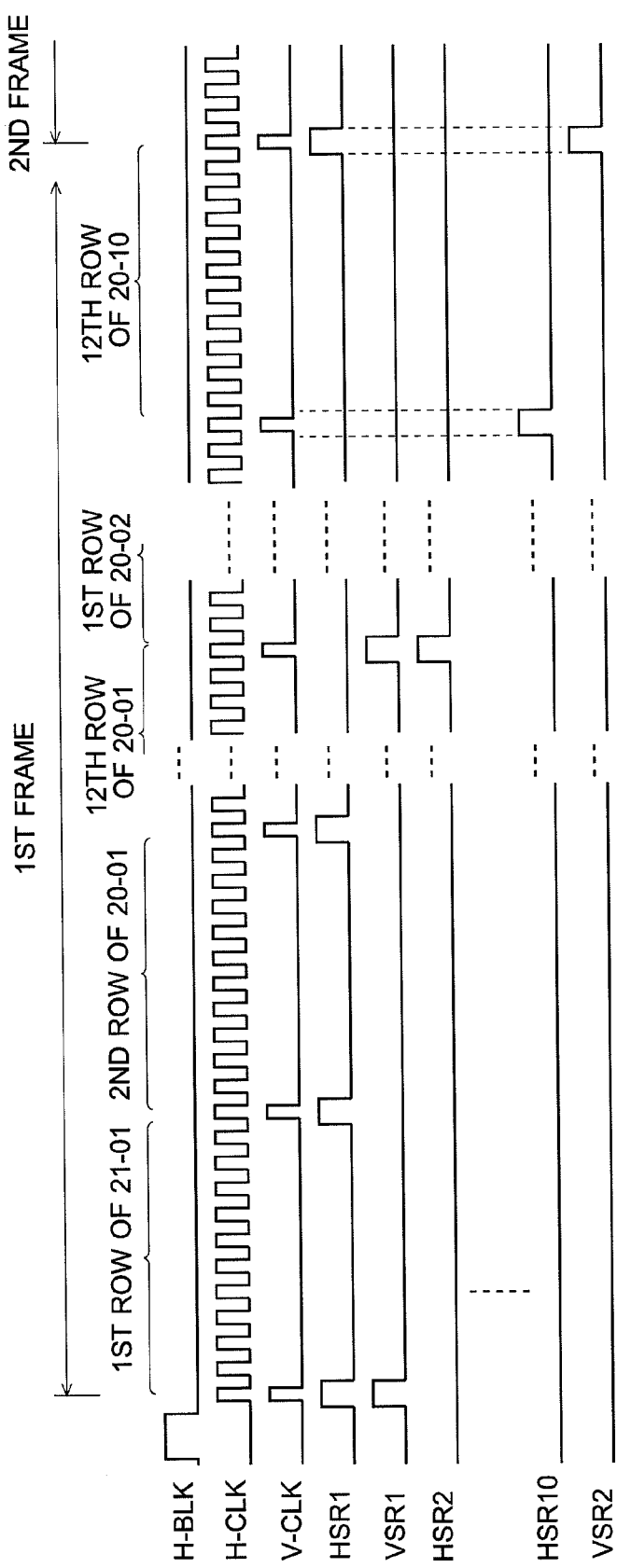
FIG. 17 is an operation timing chart of sequential reading in the burst reading mode of the solid-state image sensor of the present embodiment.
Figure 18:
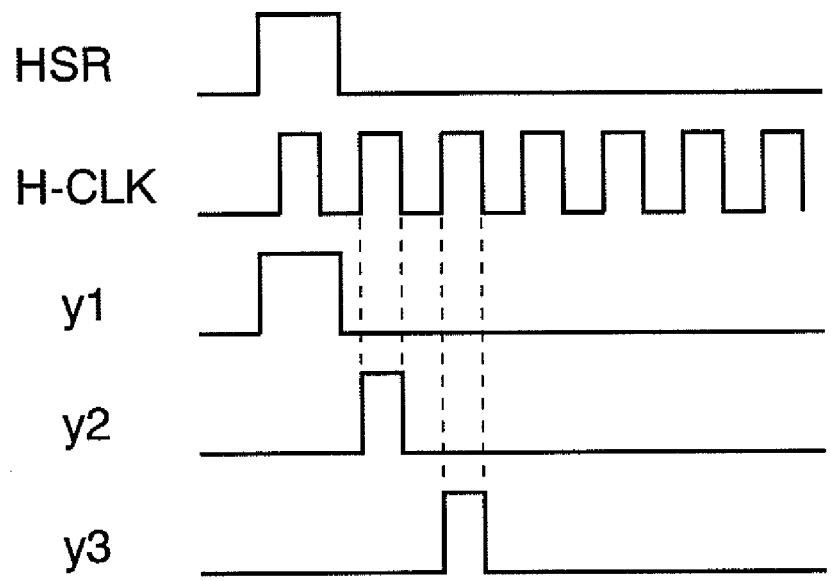
FIG. 18 is an operation timing chart of the main portion of the horizontal shift registers in the solid-state image sensor of the present embodiment.
Figure 19:
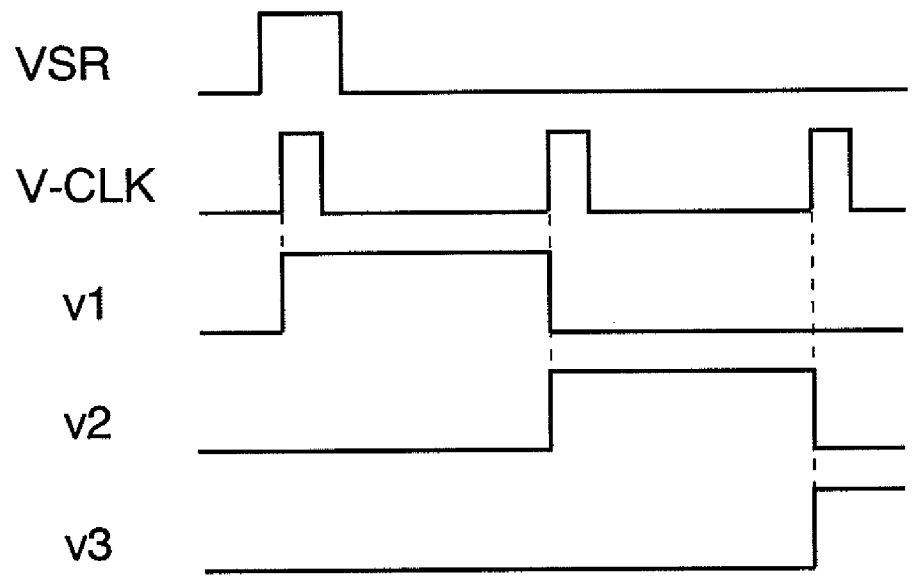
FIG. 19 is an operation timing chart of the main portion of the vertical shift registers in the solid-state image sensor of the present embodiment.

Subsequently, the horizontal shift register HSR2 and vertical shift register VSR1 are activated to select the memory section unit 20-02 on the right, and this memory section unit 20-02 becomes the target of reading, as shown in FIGS. 17 and 18. Then, as in the previous case, the signals are read by turning on the reading transistors 27 of each memory section, for one pixel after another, in the order of row column. The sequential selection of each memory section unit is continued until the memory section unit 20-10. When the reading of the memory sections 22 in the twelfth row of the memory section unit 20-10 is ended, the reading process for one frame is completed. Concurrently, in the other memory section unit blocks 50, the operation of reading signals from the memory sections of the corresponding memory section units is similarly performed.

In the case of the sequential reading in the burst reading mode, after the pixel signals of the first frame have been entirely read in the previously described manner, the reading of pixel signals of the second frame is subsequently initiated. That is, as shown in FIG. 17, the horizontal shift register HSR1 and the vertical shift register VSR2 are activated to select the leftmost memory section unit of the second row shown in FIG. 10, and the reading operation is performed in the same order as in the case of the first frame. This process is repeated to perform the reading operation through the end of the $104^{th}$ frame.

It should be noted that the reading process is not specifically limited to this one but may be appropriately modified. For example, in the burst reading mode, the pixel signals held in the memory section units 20 aligned in the uppermost row are not always the oldest signals, because there is no previously designated frame at which the process of sequentially writing signals for each frame from upper to lower rows should be discontinued. Accordingly, it is preferable to start the sequential reading operation from the row subsequent to the row at which the last writing was performed. By this method, the image signals are acquired in chronological order.

As already stated, the burst reading mode is used in a high-speed imaging operation. Since the number of consecutive image frames that can be read to the outside is 104, it is necessary to correctly capture the objective phenomenon during the 104-frame imaging process, which requires generating a trigger signal capturing the moment of occurrence of the objective phenomenon or a preceding sign of that phenomenon. The solid-state image sensor of the present invention has a built-in circuit for generating such a trigger signal. The following description deals with this trigger signal generation circuit and its operation, along with an example of the imaging operation utilizing the trigger signal in a high-speed imaging device using the present image sensor.

Figure 20:
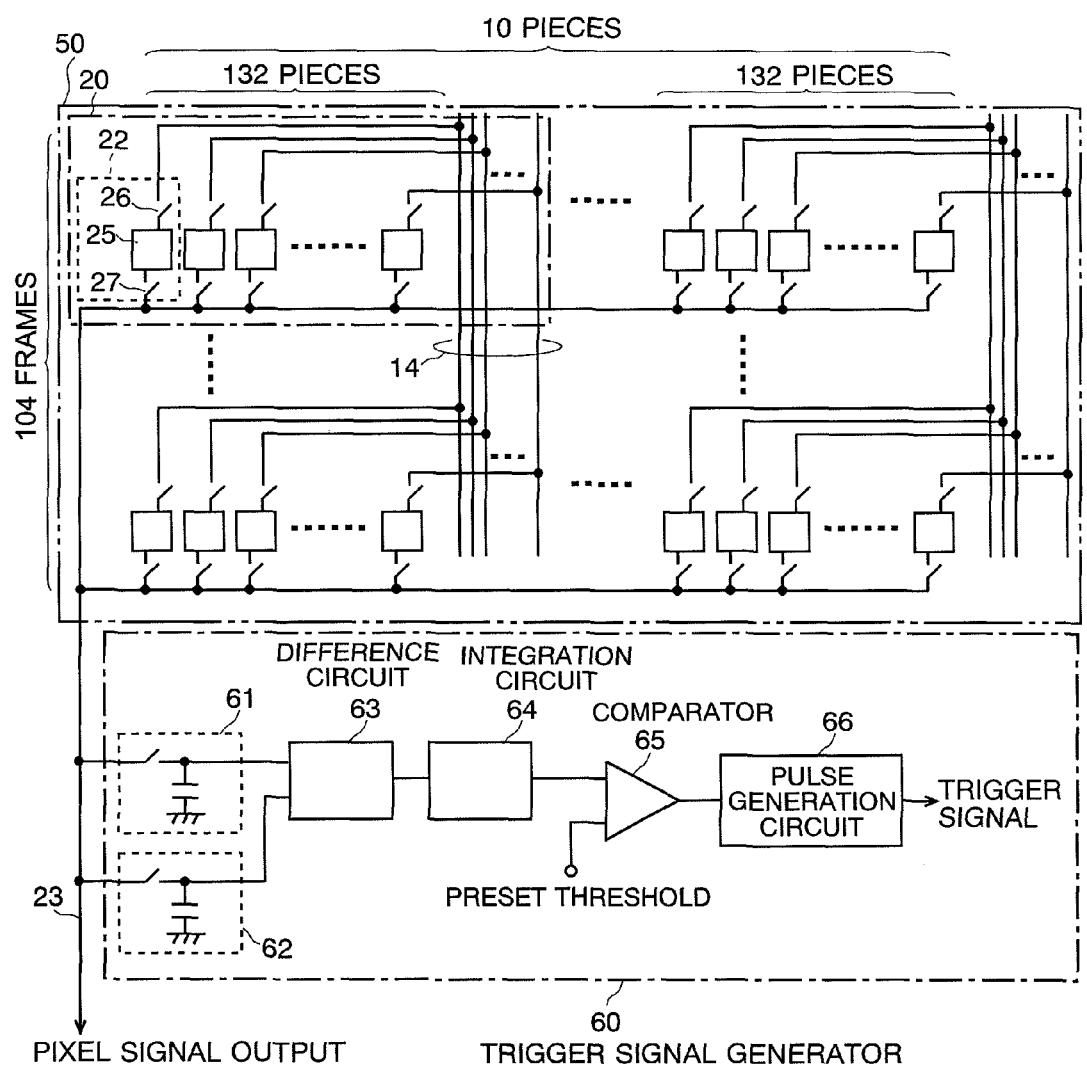
FIG. 20 is a schematic configuration diagram of a trigger generator provided for each signal output line in the solid-state image sensor of the present embodiment.
Figure 21:
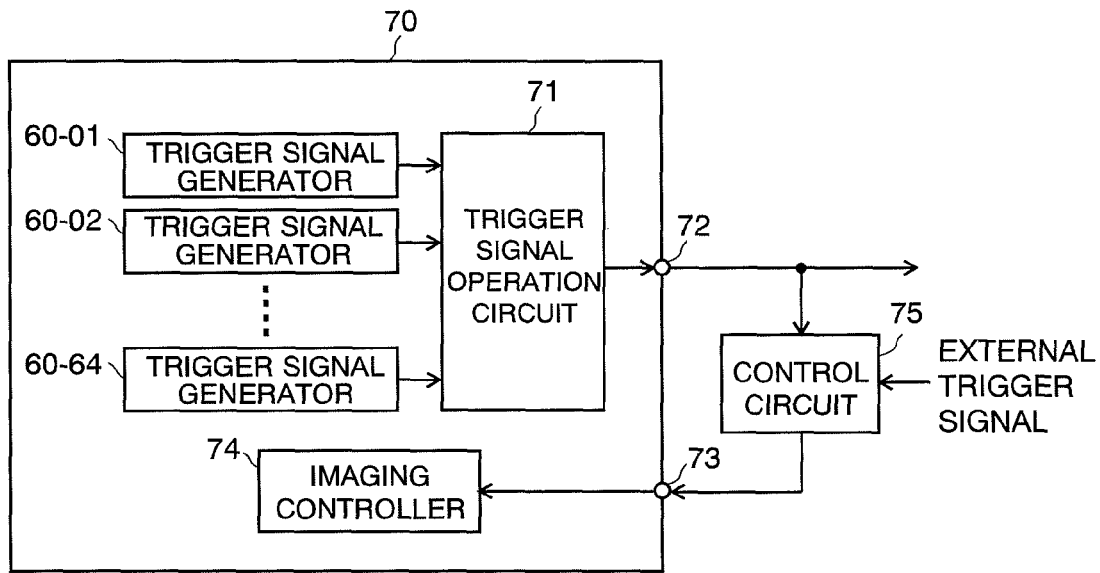
FIG. 21 is a block diagram of the main portion of an imaging device using the solid-state image sensor of the present embodiment.

FIG. 20 is a schematic configuration diagram of a trigger signal generator 60 provided for each signal output line 23, and FIG. 21 is a block diagram of the main portion of an imaging device using the present solid-state image sensor. In FIG. 20, the 132 memory sections 22 included in the memory section unit 20 are shown in a horizontally arranged form. The four memory elements included in each memory section 22 are represented as a single memory element. The signal output line 23 carries the signals that have undergone the previously described process of removing the noises and widening the dynamic range.

The trigger signal generator 60 includes the following components: two sample-and-hold circuit sections 61 and 62 connected to the signal output line 23, each circuit including a switch, capacitor and resetting circuit (not shown); a difference circuit 63 for producing a differential signal (analogue voltage difference) of the output signals of the sample-and-hold circuit sections 61 and 62; an integration circuit 64 for sequentially adding the differential signal; a comparator 65 for comparing the output value of the integration and a preset threshold; and a pulse generation circuit 66 for generating a pulse signal as a trigger signal in response to an output of the comparator 65.

As already described, the solid-state image sensor of the present embodiment has a total of 64 signal output lines 23 provided parallel to each other and for each memory section unit block 50. Accordingly, there are 64 trigger signal generators 60 shown in FIG. 20. As shown in FIG. 21, the trigger signals produced by these 64 trigger signal generators 60-01 to 60-64 are fed to a trigger signal operation circuit 71, which performs logical summation, logical multiplication, selection or other operations according to external settings. The resultant signals are integrated into one trigger signal, which is outputted through the trigger signal output terminal 72 to the outside of the solid-state image sensor 70.

The imaging device with this solid-state image sensor 70 has a control circuit 75, which receives a trigger signal from the trigger signal output terminal 72 and performs digital computations, such as a digital delay process, logical summation of the trigger signal and a sensor trigger signal obtained from another sensor or similar element, or logical multiplication of the trigger signal and a conditional signal representing another imaging condition. The trigger signal that has been processed by this control circuit 75 is fed to the trigger signal input terminal 73 of the solid-state image sensor 70. Based on this trigger signal supplied through the trigger signal input terminal 73, the imaging controller 74 performs control operations, such as the initiation or discontinuation of imaging. Alternatively, it is possible to directly connect the trigger signal output terminal 72 to the trigger signal input terminal 73 so that a trigger signal generated inside the solid-state image sensor 70 will be immediately used for controlling the imaging operation.

Figure 22:
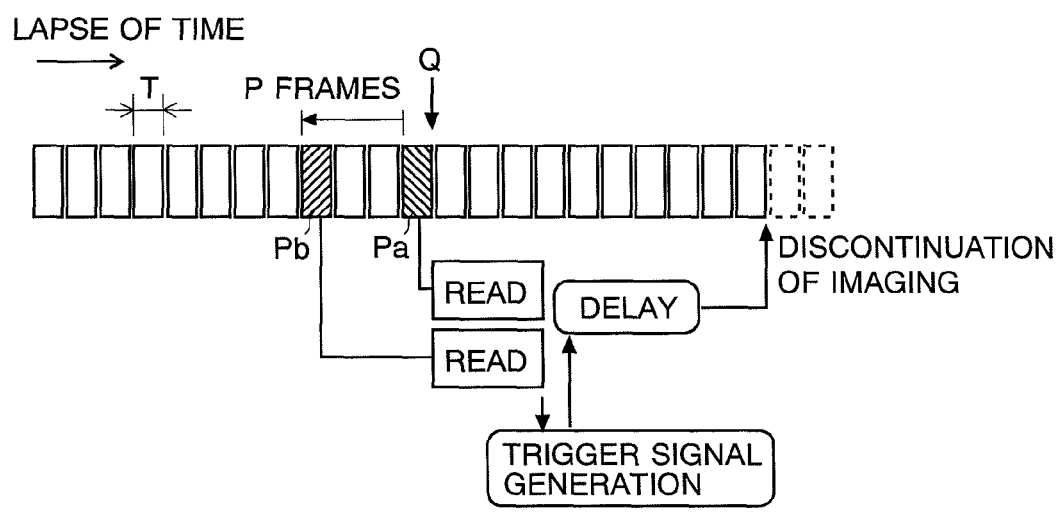
FIG. 22 is a schematic diagram for explaining the timing of controlling the imaging operation in the present imaging device.

One example of the imaging operation is hereinafter described using FIGS. 22 to 24 in addition to FIGS. 20 and 21. FIG. 22 is a schematic diagram for explaining the timing of controlling the imaging operation, FIG. 23 is a model diagram showing taken images, and FIG. 24 is a schematic diagram for explaining the selection of pixel signals.

Before the detection of a movement of or change in an imaging object, a user selects a region on the image within which the movement of or change in the object should be detected. This region may cover the entire image, although the time delay of the trigger-signal generation becomes smaller as the region is smaller. To capture a sign or beginning of an objective phenomenon or change, it is normally unnecessary to observe the entire image; observing only a specific portion of the image is often sufficient, although it depends on the type of the objective phenomenon or the mode of the movement of or change in the object. As one example, it is hereinafter supposed that the target of imaging is a jet of micro-sized droplets spouted from the tip of a pipe.

Figure 23:
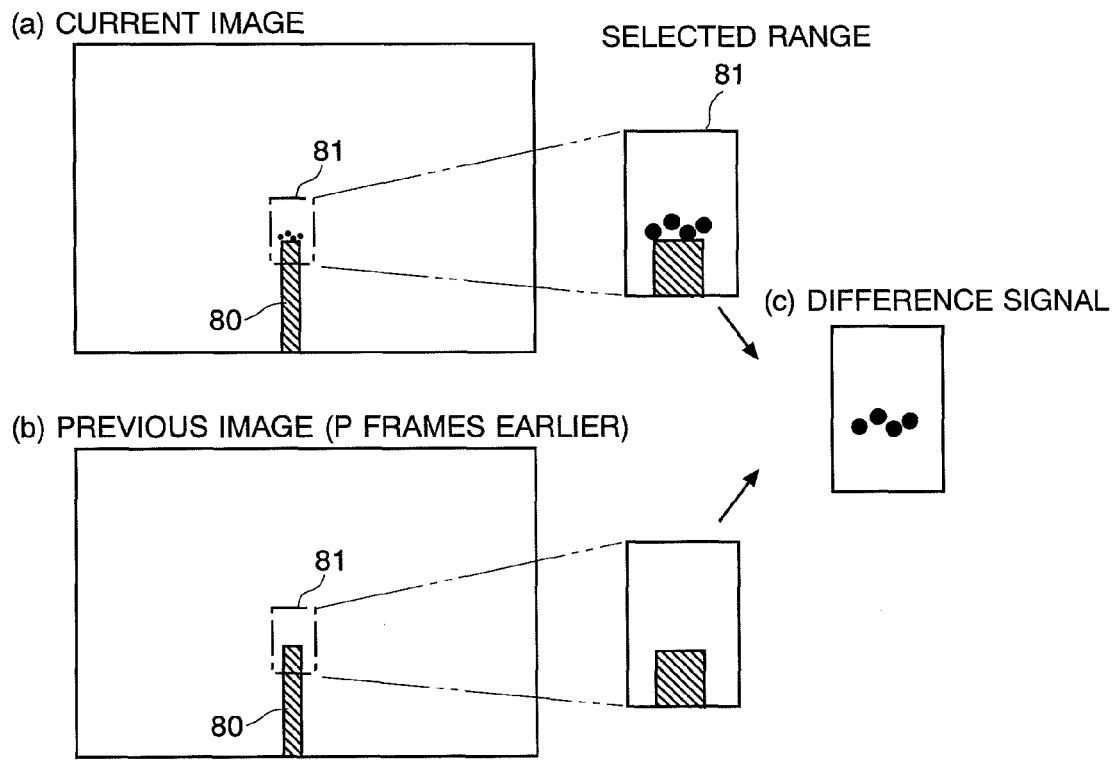
FIG. 23 is a model diagram showing taken images.
Figure 24:
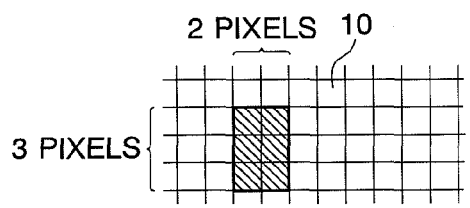
FIG. 24 is a schematic diagram for explaining the selection of pixel signals.

On the assumption that, as shown in FIG. 23(*a*), a small amount of droplets will be observed at the tip of the pipe 80 at the beginning of the phenomenon of interest, only a small region of the image including the tip of the pipe 80 needs to be observed to detect that phenomenon. Accordingly, a rectangular region 81 as shown in FIG. 23 is selected as the target region for detection. If the selected region 81 is included within the pixel area corresponding to a single memory section unit block 50, the imaging operation can be controlled by using only the trigger signal generated by one trigger signal generator 60. Accordingly, the trigger signal operation circuit 71 selects and outputs only the trigger signal generated by the trigger signal generator 60 concerned.

The detection of a change in or movement of an object is basically performed based on the frame difference between two frames. The frame difference signal may be obtained by computing the difference between the signals for each pixel at the same position. However, this method requires a considerable period of time in reading signals from the memory sections 22. Furthermore, a slight vibration of an image is likely to be mistaken for a change in the object. To lower the probability of such a wrong detection and shorten the signal-reading time, the present device performs a process including the steps of simultaneously reading signals from a plurality of pixels neighboring each other within the range of the pixel area corresponding to the same memory section unit block 50, i.e. within a pixel range having a horizontal size of 10 pixels and vertical size of 132 pixels, then summing the read signals, and calculating the difference for each sum of the signal values.

For example, it is herein assumed that a set of six pixels having a horizontal size of two pixels and vertical size of three pixels are selected, as shown in FIG. 24. In this case, six pixel signals included in the pixel set are simultaneously read from the memory sections 22 and summed up. This is equivalent to averaging the signals of these six pixels. Specifically, this can be achieved by simultaneously turning on the reading transistors 27 of the six memory sections 22 that are connected to the same signal output line 23 shown in FIG. 20 and correspond to one pixel set, whereby the signals held in the capacitors 25 of these memory sections 22 are extracted to the signal output line 23 and the six pixel signals are added together in analogue form on the signal output line 23. This process is completed with one clock. Accordingly, if, for example, the selected range 81 has a size of 30×10 pixels and hence 50 pixel sets, the signal-reading operation needs only to be performed 50 times.

To generate a trigger signal detecting a change in an imaging object, the photocharge storage at the repetition rate in the aforementioned burst reading mode and the signal transfer from each pixel 10 to the memory sections 22 are repeated. The imaging period for one frame (i.e. frame period) in this process is labeled as T in FIG. 22. Every time the imaging operation for a predetermined number of frames is completed, the pixel signals of the latest frame and those of another frame that precedes the latest one by P frames are read from the memory sections 22 concerned, and the trigger signal generator 60 investigates these pixel signals to determine whether or not a change in an object has occurred. It is herein assumed that P=3, although any value can be selected for P. Given that the current time is Q, the frame difference between the latest frame Pa and the frame Pb preceding the latest one by three frames is used. The detection of a change in the object is not performed over the entire image of the two frames Pa and Pb but only within the selected range 81 shown in FIG. 23, using the difference in the sum of the signals of the aforementioned set of six pixels.

Specifically, the operation proceeds as follows. The reading transistors 27 of six memory sections 20 corresponding to one pixel set among the memory section unit 20 holding the pixels signals corresponding to the frame Pa are simultaneously turned on, and the sum of the read signals is stored into the sample-and-hold circuit section 61. Subsequently, the reading transistors 27 of six memory sections 20 corresponding to the pixel set having the same combination of pixels among the memory section unit 20 holding the pixels signals corresponding to the frame Pb are simultaneously turned on, and the sum of the read signals is stored into the sample-and-hold circuit section 62. Then, the difference of the stored signals is obtained, and the result is integrated by the integration circuit 64. At the beginning of integration, the integration output is reset.

Next, the reading transistors 27 of the six memory sections 22 corresponding to another pixel set within the frame Pa are simultaneously turned on, and the sum of the read signals is stored into the sample-and-hold circuit section 61. Subsequently, the reading transistors 27 of the six memory sections 22 corresponding to the pixel set having the same combination of pixels in the frame Pb are simultaneously turned on, and the sum of the read signals is stored into the sample-and-hold circuit section 62. Then, the difference of the stored signals is obtained, and the result is added to the integrated value previously held in the integration circuit 64. These steps are repeated for each pixel set included in the selected range 81. The integrated value is eventually compared to a threshold in the comparator 65. If the integrated value exceeds the threshold, it is determined that a change in the object has occurred, so that the pulse generation circuit 66 generates a trigger signal. Conversely, an integrated value that does not exceed the threshold will be interpreted as no change in the object, in which case the pulse generation circuit 66 will not generate the trigger signal, i.e. a pulse signal. For example, given the two frames of image signals shown in FIGS. 23(a) and 23(b), a difference signal as shown in FIG. 23(c) will result, and this difference signal is used to determine whether a change in the object has occurred.

When a trigger signal has been generated as a result of the comparison of the frames Pa and Pb, the trigger signal is sent from the trigger signal output terminal 72 to the outside, and the control circuit 75 delays the trigger signal by the predetermined frame period T. The amount of delay can be arbitrarily set by the user; the delay should be small when a set of images preceding the generation point of the trigger signal are required, whereas the delay should be large when a set of images following the generation point of the trigger signal are required. The delayed trigger signal is sent to the trigger signal input terminal 73. Upon receiving this signal, the imaging controller 74 discontinues the imaging operation. That is, the process of writing new signals from the pixels 10 into the memory sections 20 through the pixel output lines 141 is discontinued. Thus, the imaging operation in the aforementioned burst signal-reading mode is completed, and a set of image signals ranging from this point in time back through a length of 104 frame periods are stored in the memory sections 22 of the memory areas 3a and 3b. Subsequently, the horizontal and vertical shift registers are driven in the previously described manner so that the reading transistors 27 of the memory sections 22 are sequentially turned on for the sequential reading. The read pixel signals are stored, for example, into a frame memory outside the solid-state image sensor 70.

In the process of reading signals from the capacitor 25 of each memory section 22 to the signal output line 23, the potential held in the capacitor 25 is not be preserved since this process is not performed through a buffer, such as a source follower amplifier. In short, this is a destructive reading process. Accordingly, the pixel signals of the frames that have been used for generating the trigger signal will be lost. Given this problem, it is preferable to complement the signals of these frames by interpolation using, for example, the image signals before and after the frames concerned.

In the previously described operation, a portion of the frames obtained by a continuous imaging operation in the burst reading mode are used for detecting a change in an imaging object. Unfortunately, this means that the images of the frames used in the detection process will be missed. This problem can be solved by preliminarily creating another set of pixel signals, separate from the captured image, for the detection of a change in the object. The process of reading signals from the pixel 10 to the memory section 22 through the pixel output line 141 is performed through the source follower amplifier 43 and hence is a non-destructive process. Accordingly, this can be used to store the signal of the same pixel in the same frame into two different memory sections 20 so that one signal can be used for detecting a change in an object while the other can be read as a pixel signal.

In the previous embodiment, the imaging operation is discontinued in response to a trigger signal while the continuous imaging operation in the burst reading mode is being performed. Alternatively, it is possible to perform a high-sensitivity imaging operation at relatively low-speeds until a change in the object occurs; after the change in the object is detected, the frame period T is changed so as to perform the imaging operation at high-speeds. While the continuous imaging operation in the burst reading mode is being performed, the captured image cannot be monitored since the sequential reading of the signals to the outside cannot be performed during the continuous imaging operation. Given this problem, it is possible to repeat a control process including the steps of driving the device in the continuous reading mode for only one frame as shown in FIG. 11(a) after the continuous imaging operation in the burst reading mode is continued for a predetermined number of frames, and then restart the continuous imaging operation in the burst reading mode. By this method, the captured image can be periodically monitored.

It should be noted that the foregoing embodiments are mere examples of the solid-state image sensor and imaging device according to the present invention; any change, modification or addition that is appropriately made within the spirit of the present invention will naturally fall within the scope of the claims of the present patent application.

The invention claimed is:

1. A solid-state image sensor, which is characterized by comprising:
   a) a plurality of pixels arranged in a two-dimensional array, each pixel including a photoelectric conversion element for receiving light and producing photocharges, a transfer element for transferring the photocharges produced by the photoelectric conversion element to a detection node, and a buffer element for sending an output signal corresponding to a charge from the detection node to a pixel output line to be mentioned later;
   b) a pixel output line independently provided for each pixel;
   c) a plurality of memory sections provided for each pixel in order to hold a signal extracted from the pixel through the pixel output line;
   d) a drive control unit for operating the pixels and the memory sections so that, in a middle of a process where an operation of storing photocharges corresponding to an imaging action at each pixel and an operation of transferring signals from each pixel through the pixel output line to one of the memory sections are repeatedly performed simultaneously at all the pixels while the memory section to hold the signal is sequentially selected for each imaging action, the signals corresponding to a portion or all of the pixels belonging to two frames obtained at different points in time are sequentially read from the memory sections concerned; and e) a trigger signal generating unit for detecting a change in or movement of an imaging object on a basis of the signals corresponding to a portion or all of the pixels belonging to the two frames sequentially read under a control of the drive control unit, and for generating a trigger signal.

2. The solid-state image sensor according to claim 1, which is characterized in that the drive control unit discontinues the imaging operation on a basis of the trigger signal generated by the trigger signal generating unit, and sequentially reads and outputs the signals corresponding to a plurality of frames held in the memory sections.

3. The solid-state image sensor according to claim 2, which is characterized in that a time delay or frame-number delay between a timing of generation of the trigger signal and the discontinuation of the imaging operation can be externally set.

4. The solid-state image sensor according to claim 1, which is characterized in that a specific range within the two frames for generating the trigger signal can be externally set.

5. The solid-state image sensor according to claim 1, which is characterized in that the frame interval or the time difference between the two frames for generating the trigger signal can be externally set.

6. The solid-state image sensor according to claim 1, which is characterized by comprising an output terminal for sending the trigger signal to the outside.

7. The solid-state image sensor according to claim 1, which is characterized in that the drive control unit performs a skip reading at predetermined intervals in the horizontal direction and/or vertical direction within the pixels arranged in the two-dimensional array when the signals corresponding to a portion or all of the pixels corresponding to the two frames are sequentially read from the memory sections concerned.

8. The solid-state image sensor according to claim 1, which is characterized in that, in sequentially reading the signals corresponding to a portion or all of the pixels corresponding to the two frames from the memory sections concerned, the drive control unit simultaneously reads the signals corresponding to a plurality of pixels located next to or close to each other in the horizontal direction and/or vertical direction within the pixels arranged in the two-dimensional array, and subjects the read signals to an adding or averaging operation.

9. An imaging device including a solid-state image sensor and a control unit for controlling the initiation or discontinuation of an imaging operation of the solid state-image sensor in response to a trigger signal, which is characterized in that the solid-state image sensor comprises:

a) a plurality of pixels arranged in a two-dimensional array, each pixel including a photoelectric conversion element for receiving light and producing photocharges, a transfer element for transferring the photocharges produced by the photoelectric conversion element to a detection node, and a buffer element for sending an output signal corresponding to a charge from the detection node to a pixel output line to be mentioned later;

b) a pixel output line independently provided for each pixel;

c) a plurality of memory sections provided for each pixel in order to hold a signal extracted from the pixel through the pixel output line;

d) a drive control unit for operating the pixels and the memory sections so that, in a middle of a process where an operation of storing photocharges corresponding to an imaging action at each pixel and an operation of transferring signals from each pixel through the pixel output line to one of the memory sections are repeatedly performed simultaneously at all the pixels while the memory section to hold the signal is sequentially selected for each imaging action, the signals corresponding to a portion or all of the pixels belonging to two frames obtained at different points in time are sequentially read from the memory sections concerned; and e) a trigger signal generating unit for detecting a change in or movement of an imaging object on a basis of the signals corresponding to a portion or all of the pixels belonging to the two frames sequentially read under a control of the drive control unit, and for generating the trigger signal to be supplied to the control unit.

10. The solid-state image sensor according to claim 9, which is characterized in that the drive control unit discontinues the imaging operation on a basis of the trigger signal generated by the trigger signal generating unit, and sequentially reads and outputs the signals corresponding to a plurality of frames held in the memory sections.

11. The solid-state image sensor according to claim 10, which is characterized in that a time delay or frame-number delay between a timing of generation of the trigger signal and the discontinuation of the imaging operation can be externally set.

12. The solid-state image sensor according to claim 9, which is characterized in that a specific range within the two frames for generating the trigger signal can be externally set.

13. The solid-state image sensor according to claim 9, which is characterized in that the frame interval or the time difference between the two frames for generating the trigger signal can be externally set.

14. The solid-state image sensor according to claim 9, which is characterized by comprising an output terminal for sending the trigger signal to the outside.

15. The solid-state image sensor according to claim 9, which is characterized in that the drive control unit performs a skip reading at predetermined intervals in the horizontal direction and/or vertical direction within the pixels arranged in the two-dimensional array when the signals corresponding to a portion or all of the pixels corresponding to the two frames are sequentially read from the memory sections concerned.

16. The solid-state image sensor according to claim 9, which is characterized in that, in sequentially reading the signals corresponding to a portion or all of the pixels corresponding to the two frames from the memory sections concerned, the drive control unit simultaneously reads the signals corresponding to a plurality of pixels located next to or close to each other in the horizontal direction and/or vertical direction within the pixels arranged in the two-dimensional array, and subjects the read signals to an adding or averaging operation.

* * * * *